United States Patent
Kubota

(10) Patent No.: US 10,084,862 B2
(45) Date of Patent: Sep. 25, 2018

(54) SESSION CONTROL METHOD AND COMPUTER-READABLE STORAGE MEDIUM STORING COMPUTER PROGRAM

(71) Applicant: FUJITSU LIMITED, Kawasaki-shi, Kanagawa (JP)

(72) Inventor: Makoto Kubota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 232 days.

(21) Appl. No.: 15/237,652

(22) Filed: Aug. 16, 2016

(65) Prior Publication Data

US 2017/0064003 A1 Mar. 2, 2017

(30) Foreign Application Priority Data

Sep. 2, 2015 (JP) ................. 2015-172754

(51) Int. Cl.
*G06F 15/16* (2006.01)
*H04L 29/08* (2006.01)

(52) U.S. Cl.
CPC .......... *H04L 67/14* (2013.01); *H04L 67/1097* (2013.01); *H04L 67/327* (2013.01)

(58) Field of Classification Search
CPC .... H04L 67/14; H04L 67/1097; H04L 67/327
USPC ........................................................ 709/228
See application file for complete search history.

(56) References Cited

U.S. PATENT DOCUMENTS

| 6,937,566 B1 * | 8/2005 | Forslow | H04L 1/0017 |
| | | | 370/231 |
| 8,863,269 B2 * | 10/2014 | Nakashima | H04L 49/355 |
| | | | 709/227 |
| 8,885,651 B2 * | 11/2014 | Purohit | H04W 76/38 |
| | | | 370/395.2 |
| 8,971,335 B2 * | 3/2015 | Harel | H04L 45/38 |
| | | | 370/401 |
| 9,485,292 B2 * | 11/2016 | Devireddy | H04L 67/42 |
| 9,544,337 B2 * | 1/2017 | Eswara | H04L 65/103 |
| 9,674,731 B2 * | 6/2017 | Raleigh | H04W 28/0289 |
| 9,706,340 B2 * | 7/2017 | Kim | H04W 4/008 |

(Continued)

FOREIGN PATENT DOCUMENTS

| JP | 2005-32172 | 2/2005 |
| JP | 2012-38299 | 2/2012 |

(Continued)

*Primary Examiner* — Melvin H Pollack
(74) *Attorney, Agent, or Firm* — Fujitsu Patent Center

(57) ABSTRACT

A session control method includes storing control information in which a first connection established on a first apparatus side in relation to a relay process is associated with a second connection established on a second apparatus side in relation to the relay process; terminating, when a close instruction message at a communication layer higher than the first and second connections is issued from the first apparatus to the second apparatus, the close instruction message on the relay process and updating the control information; and enabling, when a switchover notice indicating a switch from the first apparatus to a third apparatus is given and the control information indicates the issuance of the close instruction message, a third connection established on the third apparatus side in relation to the relay process and updating the control information in such a manner that the second connection is associated with the third connection.

5 Claims, 21 Drawing Sheets

(56) References Cited

U.S. PATENT DOCUMENTS

| | | | |
|---|---|---|---|
| 9,838,441 B2* | 12/2017 | Khawam | H04L 65/1069 |
| 9,906,565 B2* | 2/2018 | Mutikainen | H04L 65/1016 |
| 2004/0267939 A1* | 12/2004 | Yumoto | H04L 29/06 |
| | | | 709/227 |
| 2005/0243746 A1* | 11/2005 | Mutikainen | H04L 65/1069 |
| | | | 370/282 |
| 2006/0242310 A1* | 10/2006 | Quah | H04L 65/1016 |
| | | | 709/229 |
| 2008/0022000 A1* | 1/2008 | Furuya | H04L 12/2854 |
| | | | 709/228 |
| 2008/0049648 A1* | 2/2008 | Liu | H04L 65/1016 |
| | | | 370/310 |
| 2009/0103537 A1 | 4/2009 | Takahashi | |
| 2009/0168758 A1* | 7/2009 | Apelqvist | H04L 29/12066 |
| | | | 370/352 |
| 2010/0107205 A1 | 4/2010 | Foti | |
| 2010/0267390 A1* | 10/2010 | Lin | H04L 51/38 |
| | | | 455/445 |
| 2012/0036180 A1 | 2/2012 | Thornton et al. | |
| 2012/0284395 A1* | 11/2012 | Miyashita | H04L 41/0816 |
| | | | 709/224 |
| 2013/0275604 A1* | 10/2013 | Tanimoto | H04L 12/4675 |
| | | | 709/227 |
| 2014/0310421 A1* | 10/2014 | Noldus | H04L 65/1069 |
| | | | 709/228 |
| 2015/0046396 A1* | 2/2015 | Limaye | G06F 17/30575 |
| | | | 707/625 |
| 2015/0071125 A1* | 3/2015 | Wang | H04L 12/1407 |
| | | | 370/259 |
| 2015/0381523 A1* | 12/2015 | Kure | H04L 67/14 |
| | | | 370/254 |
| 2016/0057178 A1* | 2/2016 | Noldus | H04L 65/1016 |
| | | | 709/228 |
| 2016/0127474 A1* | 5/2016 | Sharma | H04L 67/14 |
| | | | 709/228 |
| 2016/0156676 A1* | 6/2016 | Verin | H04L 65/1016 |
| | | | 709/228 |
| 2016/0249401 A1* | 8/2016 | Tanaka | H04M 3/00 |
| 2017/0019424 A1* | 1/2017 | Rodrigues De Moura Leitao | H04L 63/08 |
| 2017/0048739 A1* | 2/2017 | Jeong | H04W 4/70 |
| 2017/0078922 A1* | 3/2017 | Raleigh | H04W 28/10 |
| 2017/0164253 A1* | 6/2017 | Fujinami | H04W 76/10 |
| 2017/0272474 A1* | 9/2017 | Stille | H04L 65/1069 |
| 2017/0344703 A1* | 11/2017 | Ansari | H04L 63/0876 |
| 2017/0366433 A1* | 12/2017 | Raleigh | H04W 4/24 |

FOREIGN PATENT DOCUMENTS

| | | |
|---|---|---|
| JP | 2012-507236 | 3/2012 |
| JP | 2012-147415 | 8/2012 |
| WO | 2006/126403 | 11/2006 |
| WO | 2010/049863 | 5/2010 |

* cited by examiner

CONTROL INFORMATION STORING UNIT

TERMINAL INFORMATION TABLE — 124

| TERMINAL-SIDE SOCKET | HTTP HEADER |
|---|---|
| SOCKET-1 | User-Agent: XBrowser/5.0<br>Accept: text/html, application/xhtml<br>Accept-Language: ja, en-us;q=0.7<br>Accept-Encoding: gzip, deflate |

SOCKET MAPPING TABLE — 125

| TERMINAL-SIDE SOCKET | UPGRADE STATUS | SERVER-SIDE SOCKET | POINTER |
|---|---|---|---|
| SOCKET-1 | FALSE | SOCKET-10 | #1 |

MIGRATION MANAGEMENT TABLE — 126

| INDEX | VIRTUAL URL | MIGRATION STATUS |
|---|---|---|
| #1 | ws://vurl:80/app1 | FALSE |

URL MAPPING TABLE — 127

| VIRTUAL URL | REAL URL |
|---|---|
| ws://vurl:80/app1 | ws://10.x.x.30:8880/app1 |

FIG. 12

SESSION CONTROL METHOD AND COMPUTER-READABLE STORAGE MEDIUM STORING COMPUTER PROGRAM

CROSS-REFERENCE TO RELATED APPLICATION

This application is based upon and claims the benefit of priority of the prior Japanese Patent Application No. 2015-172754, filed on Sep. 2, 2015, the entire contents of which are incorporated herein by reference.

FIELD

The embodiments discussed herein are related to a session control method and a computer-readable storage medium storing a computer program.

BACKGROUND

Conventionally it has often been the case that a stateless communication protocol which does not keep a connection open for a long time is used for communication between a client and a server. For example, in the case of the Hypertext Transfer Protocol (HTTP), the client establishes a Transmission Control Protocol (TCP) connection with the server in order to transmit HTTP messages, and closes the TCP connection after completing the transmission of a block of HTTP messages. Such stateless communication protocols tend to incur substantial communication costs when data transmission takes place frequently between clients and servers and when data is transmitted bi-directionally in real time.

On the other hand, a stateful communication protocol enabling a long-held connection may be used instead for a connection between a client and a server. For example, the specification of the WebSocket protocol is defined by the Internet Engineering Task Force (IETF) as Request for Comments (RFC) 6455. In the WebSocket protocol, the client and the server establish a TCP connection and transmit WebSocket messages between each other over the TCP connection. The established TCP connection need not be closed at once when transmission of a block of WebSocket messages is completed, and the client or server is able to continue to use the TCP connection to transmit subsequent WebSocket messages.

When there is no need for the client and the server to maintain the connection open any longer, one of them transmits a WebSocket message indicating a connection closure (referred to as a "close notice") to the other. When the close notice is transmitted, the TCP connection which works on a lower communication layer than WebSocket is no longer needed and therefore closed. Compared to stateless communication protocols, stateful communication protocols reduce communication costs when data transmission takes place frequently between clients and servers and when data is transmitted bi-directionally in real time.

A session control method has been proposed which allows a terminal communicating with a second terminal to be switched from a first terminal to a third terminal during the communication. According to the proposed session control method, a local proxy running on the first terminal saves control information on a session between the first and the second terminal. In response to a terminal switch instruction from the user, the local proxy requests the second terminal to establish a session with the third terminal based on the control information. Upon receiving a message indicating the completion of the session establishment from the second terminal, the local proxy closes the session between the first and the second terminal.

There is also a proposed switching apparatus (load balancer) for distributing request messages transmitted from clients across a plurality of servers. The proposed switching apparatus establishes a TCP connection with a client and receives a request message from the client. Then, the switching apparatus selects one from a plurality of servers and establishes a TCP connection with the selected server, and then transfers the request message to the selected server. Upon receiving a FIN packet from the selected server, the switching apparatus closes the TCP connection with the server. The switching apparatus also transfers the FIN packet to the client to thereby close the TCP connection with the client.

In addition, there is a proposed system for switching a terminal to reproduce content from a first terminal to a second terminal. According to the proposed system, the first terminal establishes a session with a content server and starts receiving content from the content server. In the case of performing terminal switchover, the first terminal requests the content server to stop content delivery and informs an application server of the identifier of the session. The second terminal acquires the identifier of the session used by the first terminal from the application server and requests the content server to resume the content delivery by designating the acquired session identifier.

In addition, there is a proposed load balancer for providing services for a client using a plurality of servers upon request of the client. The proposed load balancer establishes a TCP connection with the client and receives a service request from the client. The load balancer generates an "Interest" message including identification information of the TCP connection and broadcasts the message to the servers. The load balancer selects a server responding fastest to the Interest message and establishes a session between the selected server and the client.

Further, there is a proposed relay apparatus for filtering packets encapsulated in the Secure Socket Layer (SSL) protocol according to a higher-level protocol in use. The proposed relay apparatus tests communication with a destination server using each of a plurality of higher-level protocols and determines a higher-level protocol with successful outcome. The relay apparatus infers that the higher-level protocol allowing successful communication is a higher-level protocol to be used by a client, and determines whether to relay or discard the packets according to the inferred higher-level protocol.

See, for example, Japanese Laid-open Patent Publication No. 2005-32172, International Publication Pamphlet No. WO 2006126403, International Publication Pamphlet No. WO 2010049863, Japanese Laid-open Patent Publication No. 2012-38299, and Japanese Laid-open Patent Publication No. 2012-147415.

It is sometimes the case that, when a connection is kept open between two apparatuses, switching one of the apparatuses is desired because of, for example, its workload status or the need of maintenance. For example, when a TCP connection stays open for WebSocket communication between a client and a server, switching of the server communicating with the client may be desired. However, switching one of the two apparatuses causes a change of a communication address, which prevents the continuous use of the original connection after the switching. As a result, the other apparatus is cut off from the connection and loses the communication and, therefore, needs to re-establish a connection with a post-switching apparatus. In this regard, a user may need to go through operations to access the post-switching apparatus, thus impairing the convenience of the user.

One conceivable method to mitigate the effect of switching one of the apparatuses would be to run a relay process, such as a reverse proxy, on a communication path between the two apparatuses. The relay process establishes a connection with one of the apparatuses and also establishes a different connection with the other apparatus, and then transfers messages between the two connections.

However, in general, a relay process takes no notice of the content of a message from a higher-level communication layer and simply transfers a message received from one connection to the other. Therefore, if a close instruction message at a higher-level communication layer is issued from one apparatus to the other apparatus, the close instruction message is transmitted over the relay process. This leads to a problem that the other apparatus closes the connection in response to the close instruction message. For example, a reverse proxy usually does not filter WebSocket messages and, therefore, indiscriminately transfers even a close message issued from a server to a client. Upon receiving the close message, the client closes a TCP connection. That is, even if a connection between the two apparatuses is divided into two separate connections by running the relay process, both the connections may be closed by an instruction from a higher-level communication layer.

SUMMARY

According to an aspect, there is provided a session control method executed by a system in which a first apparatus and a second apparatus are able to communicate with each other via a relay process and a third apparatus and the second apparatus are able to communicate with each other via the relay process. The session control method includes storing control information in which a first connection established on a first apparatus side in relation to the relay process is associated with a second connection established on a second apparatus side in relation to the relay process; terminating, when a close instruction message at a communication layer higher than the first and second connections is issued from the first apparatus to the second apparatus, the close instruction message on the relay process and updating the control information in response to issuance of the close instruction message; and enabling, when a switchover notice indicating a switch from the first apparatus to the third apparatus is given and the control information indicates issuance of the close instruction message, a third connection established on a third apparatus side in relation to the relay process and updating the control information in such a manner that the second connection is associated with the third connection.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 illustrates an example of control tables held by the reverse proxy;

DESCRIPTION OF EMBODIMENTS

Figure 1:
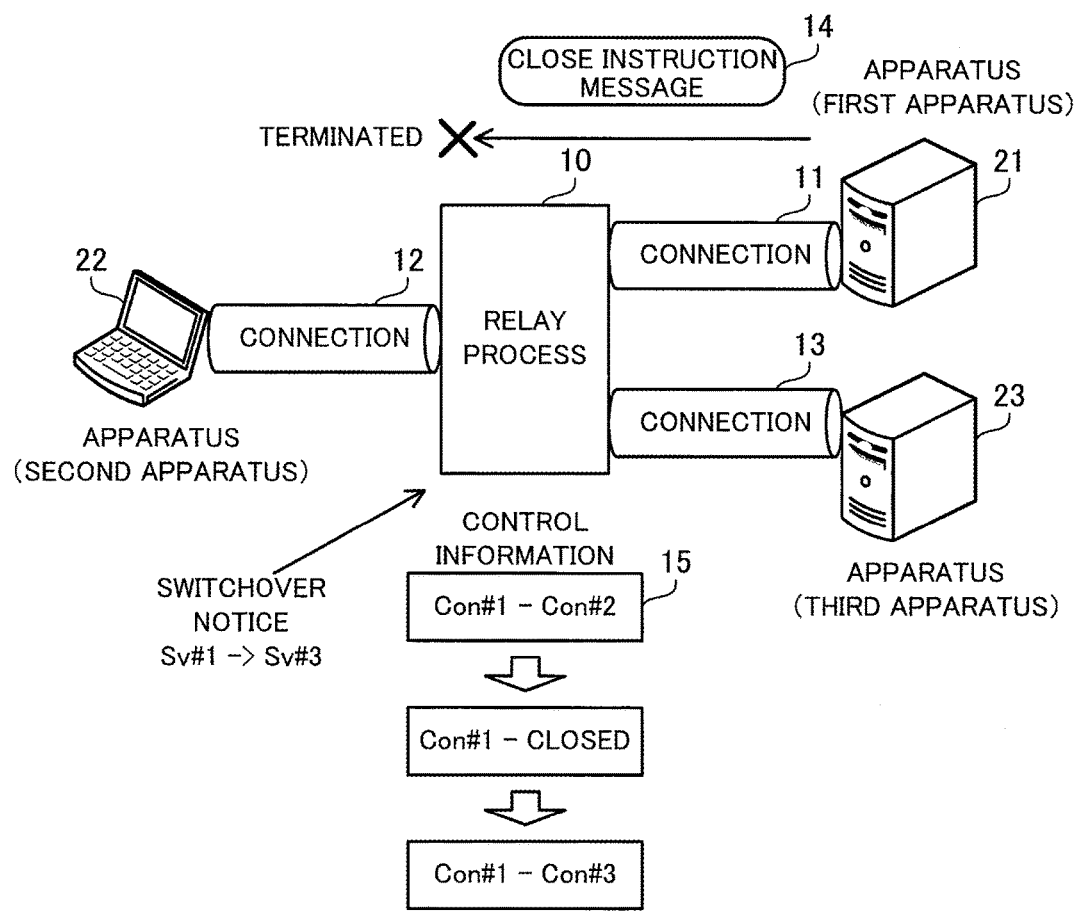
FIG. 1 illustrates an example of an information processing system according to a first embodiment.

Several embodiments will be described below with reference to the accompanying drawings, wherein like reference numerals refer to like elements throughout.

(a) First Embodiment

FIG. 1 illustrates an example of an information processing system according to a first embodiment. The information processing system according to the first embodiment includes a relay process 10, an apparatus 21 (first apparatus), an apparatus 22 (second apparatus), and an apparatus 23 (third apparatus). Each of the apparatuses 21 to 23 may be an information processor or a computer. More specifically, each of the apparatuses 21 to 23 may be a terminal (such as a client computer) operated by a user, or a server unit (such as a server computer) accessed from terminals. An application where the apparatus 22 is a terminal and the apparatuses 21 and 23 are server units is given here as an example. The apparatuses 21 and 22 are able to communicate with each other via the relay process 10. Similarly, the apparatuses 23 and 22 are able to communicate with each other via the relay process 10. The relay process 10 transfers data between the apparatus 22 and the apparatuses 21 and 23. The relay process 10 may be a reverse proxy. For example, the relay process 10 hides the identification of a specific communication endpoint (the apparatus 21 or 23) from the apparatus 22. The relay process 10 may be installed on the apparatus 21 or 23, or on an apparatus different from the apparatuses 21 to 23.

Now let us consider the case where the apparatus 22 first communicates with the apparatus 21 and then switches the communication endpoint in the middle from the apparatus 21 to the apparatus 23. The switching from the apparatus 21 to the apparatus 23 may be implemented, for example, when the apparatus 21 is placed under high loads, when a communication channel between the relay process 10 and the apparatus 21 is congested, or when maintenance work of the apparatus 21 is performed. In such a case, an application process communicating with the apparatus 22 may be migrated from the apparatus 21 to the apparatus 23.

When the apparatus 21 is the communication endpoint of the apparatus 22, the relay process 10 establishes a connection 11 on the apparatus 21 side and a connection 12 on the apparatus 22 side. The connections 11 and 12 are, for example, TCP connections. In the case where the relay process 10 is installed on an apparatus different from the apparatuses 21 and 22 (e.g. the apparatus 23), for example, the connection 11 is established between the different apparatus and the apparatus 21 and the connection 12 is established between the different apparatus and the apparatus 22. On the other hand, when the relay process 10 is installed on the apparatus 21, the connection 11 of the relay process 10 on the apparatus 21 side represents an intra-apparatus connection between the application process and the relay process 10 installed on the apparatus 21.

The relay process 10 stores therein control information 15 associating the connections 11 and 12 with each other. The control information 15 is stored in, for example, a memory device of an apparatus on which the relay process 10 is installed. The memory device may be a volatile memory device such as random access memory (RAM) or a nonvolatile memory device such as a hard disk drive (HDD). Based on the control information 15, the relay process 10 transfers data between the connections 11 and 12. That is, the relay process 10 transmits data received from the connection 11 to the connection 12, and transmits data received from the connection 12 to the connection 11. The data transmitted between the connections 11 and 12 includes messages from a communication layer higher than the connections 11 and 12. For example, when the connections 11 and 12 are TCP connections, messages in WebSocket, which is a higher level communication protocol than TCP, may be transmitted over the connections 11 and 12.

In the case of switching the communication endpoint of the apparatus 22 from the apparatus 21 to the apparatus 23, the connection 11 cannot be passed on to the apparatus 23 because of a change of a communication address (for example, an Internet Protocol (IP) address and a TCP port number). On this occasion, the apparatus 21 may transmit, to the apparatus 22, a close instruction message 14 at a communication layer higher than the connections 11 and 12. When the connections 11 and 12 are TCP connections, the close instruction message 14 differs from a FIN packet which is a TCP control packet. One example of the close instruction message 14 is a WebSocket close message. Upon receiving the close instruction message 14 from the connection 11, the relay process 10 terminates the close instruction message 14. That is, the relay process 10 discards the close instruction message 14 without transferring it to the designated destination (i.e., the apparatus 22). If the close instruction message 14 is transferred to the apparatus 22, the apparatus 22 recognizes termination or interruption of services in the higher-level communication layer and closes the connection 12. On the other hand, when the relay process 10 blocks the close instruction message 14, the apparatus 22 recognizes the continuation of the services at the higher-level communication layer and keeps the connection 12 open.

Note however that the relay process 10 may terminate the close instruction message 14 only in the case of switching the communication endpoint of the apparatus 22 and may, in cases other than this, transfer the close instruction message 14 to the apparatus 22. In this regard, a management server for managing the system may notify the relay process 10 of whether communication endpoint switchover is taking place. Upon receiving the close instruction message 14, the relay process 10 also updates the control information 15 so that the reception of the close instruction message 14 is reflected in the control information 15. For example, the relay process 10 records, in the control information 15, information indicating the reception of the close instruction message 14 in association with the connection 11. In addition, the relay process 10 records, in the control information 15, for example, that the connection 11 is no longer needed or has been closed.

Subsequently, the relay process 10 receives a switchover notice indicating a switch from the apparatus 21 to the apparatus 23. In this regard, the management server managing the system, for example, sends the switchover notice to the relay process 10. The switchover notice may indicate that the migration of the application process from the apparatus 21 to the apparatus 23 has been completed. In the case where the switchover notice is received and the control information 15 then indicates the reception of the close instruction message 14, the relay process 10 enables a connection 13 established on the apparatus 23 side.

The connection 13 is of the same type as the connections 11 and 12, and is, for example, a TCP connection. In the case where the relay process 10 is installed on an apparatus different from the apparatus 23 (e.g. the apparatus 21), for example, the connection 13 is established between the different apparatus and the apparatus 23. On the other hand, when the relay process 10 is installed on the apparatus 23, the connection 13 of the relay process 10 on the apparatus 23 side represents an intra-apparatus connection between the application process and the relay process 10 installed on the apparatus 23.

The relay process 10 may establish the connection 13 in response to the reception of the switchover notice, or may establish in advance the connection 13 before the reception of the switchover notice. In the former case, the process of enabling the connection 13 may include the establishment of the connection 13. In the latter case, the process of enabling the connection 13 may include assignment of the connection 13 to the apparatus 22. In addition, the step of enabling the connection 13 may include associating the services in the higher-level communication layer with the connection 13 (e.g. performing a handshake at the higher-level communication layer over the connection 13).

After enabling the connection 13, the relay process 10 associates the connections 12 and 13 with each other and updates the control information 15 so as to indicate the association. For example, in place of the association between the connections 11 and 12, the association between the connections 12 and 13 is registered in the control information 15. From this point onwards, the relay process 10 transfers data between the connections 12 and 13 based on the control information 15. That is, the relay process 10 transmits data received from the connection 12 to the connection 13, and transmits data received from the connection 13 to the connection 12.

According to the information processing system of the first embodiment, when the communication endpoint of the apparatus 22 is changed from the apparatus 21 to the apparatus 23, the close instruction message 14 at the higher-level communication layer issued by the apparatus 21 to the apparatus 22 is terminated on the relay process 10. This allows the apparatus 22 to recognize the continuation of the services at the higher-level communication layer, thereby preventing the apparatus 22 from closing the connection 12 in response to the close instruction message 14.

After the apparatus switching is completed, the connections 12 and 13 are associated with each other and data is relayed by the relay process 10 between the apparatuses 22 and 23. Herewith, even after the apparatus switching, the apparatus 22 is able to continuously use the connection 12 established before the apparatus switching and need not re-establish a new connection. This allows the user of the apparatus 22 to continue to use the services even after the switching without the need for operations, such as login procedures, thus preventing user's convenience from being impaired.

(b) Second Embodiment

Figure 2:
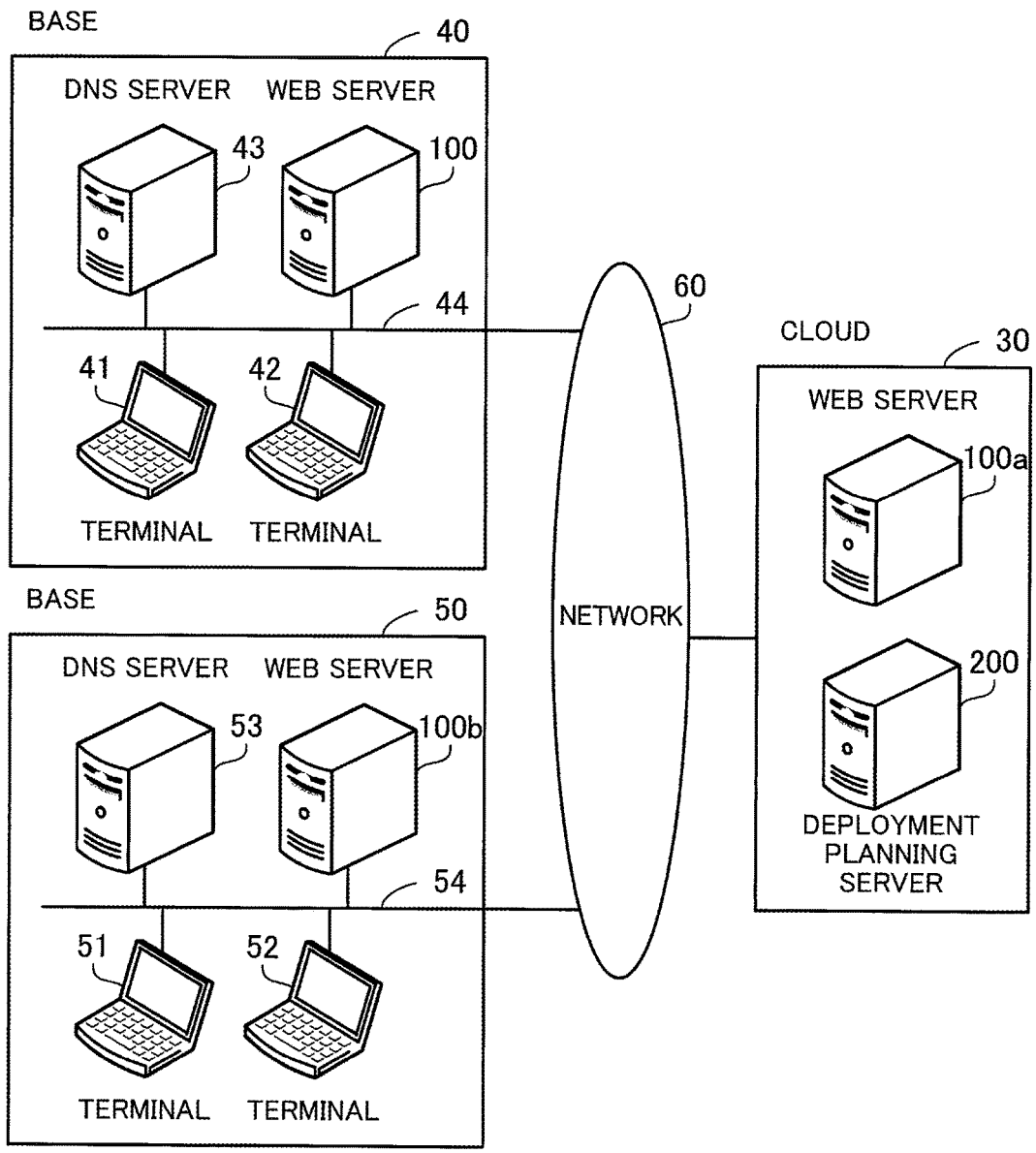
FIG. 2 illustrates an information processing system according to a second embodiment.

FIG. 2 illustrates an information processing system according to a second embodiment. The information processing system of the second embodiment includes a cloud 30, bases 40 and 50, and a network 60. The cloud 30 and the bases 40 and 50 are set up at locations away from each other and connected to each other via the wide-area network 60. The cloud 30 is a shared information processing facility accessible from a plurality of bases, and is implemented using, for example, a data center. Each of the bases 40 and 50 is a center at which members of an organization conduct their business affairs and, for example, an office or factory where employees of a company perform their business activities.

The cloud 30 includes a Web server 100a and a deployment planning server 200. The base 40 includes terminals 41 and 42, a domain name system (DNS) server 43, and a Web server 100. The terminals 41 and 42, the DNS server 43, and the Web server 100 are all connected to a local network 44 of the base 40. The network 44 is connected to the network 60. The base 50 includes the terminals 51 and 52, a DNS server 53, and a Web server 100b. The terminals 51 and 52, the DNS server 53, and the Web server 100b are all connected to a local network 54 of the base 50. The network 54 is connected to the network 60.

Each of the terminals 41, 42, 51, and 52 is a client computer operated by a user. The terminals 41, 42, 51, and 52 individually execute a client application, such as a Web browser, and communicate with one or more server applications running on the Web servers 100, 100a, and 100b. The DNS servers 43 and 53 are server computers for managing information indicating mappings between domain names and Internet Protocol (IP) addresses. The DNS server 43 receives an address resolution request with designation of a domain name from each of the terminals 41 and 42, and returns an IP address corresponding to the domain name to the requestor. In like fashion, the DNS server 53 receives an address resolution request with designation of a domain name from each of the terminals 51 and 52, and returns an IP address corresponding to the domain name to the requestor.

Each of the Web servers 100, 100a, and 100b is able to execute a server application for providing services to the client applications. Each server application is identified by a uniform resource locator (URL). According to the second embodiment, server applications are able to migrate among the Web servers 100, 100a, and 100b. Each of the Web servers 100 and 100b also runs a reverse proxy so that the terminals 41, 42, 51, and 52 are not aware of the location of each server application.

To each server application, a virtual URL independent of a Web server to which the server application is deployed is assigned, aside from a real URL depending on the Web server. The DNS server 43 associates the IP address of the Web server 100 with the virtual URL. Herewith, when the user of the terminal 41/42 designates the virtual URL, its client application accesses the Web server 100. The reverse proxy of the Web server 100 transfers the access request to an appropriate Web server when the server application corresponding to the virtual URL is not present on the Web server 100. In like fashion, the DNS server 53 associates the IP address of the Web server 100b with the virtual URL. Herewith, when the user of the terminal 51/52 designates the virtual URL, its client application accesses the Web server 100b. The reverse proxy of the Web server 100b transfers the access request to an appropriate Web server when the server application corresponding to the virtual URL is not present on the Web server 100b. This allows the client applications on the terminals 41, 42, 51, and 52 to communicate with each server application without regard to the location of the server application.

The deployment planning server 200 is a server computer for controlling deployment of one or more server applications to the Web servers 100, 100a, and 100b. The server application deployment is determined according to, for example, the communication state between the cloud 30 and the bases 40 and 50, workload on the Web servers 100, 100a, and 100b, and maintenance schedules of the Web servers 100, 100a, and 100b. For example, a server application is first deployed to the Web server 100a in the cloud 30. When a lot of access operations are made from the base 40 to the server application and the network 60 delay is high, it may be considered appropriate to migrate the server application to the Web server 100 from the Web server 100a.

Note that the server application deployment may be changed with respect to each server application, that is, with respect to each virtual URL. Note also that the deployment planning server 200 is installed at the cloud 30 according to the example of FIG. 2; however, it may be installed at the base 40 or 50.

Figure 3:
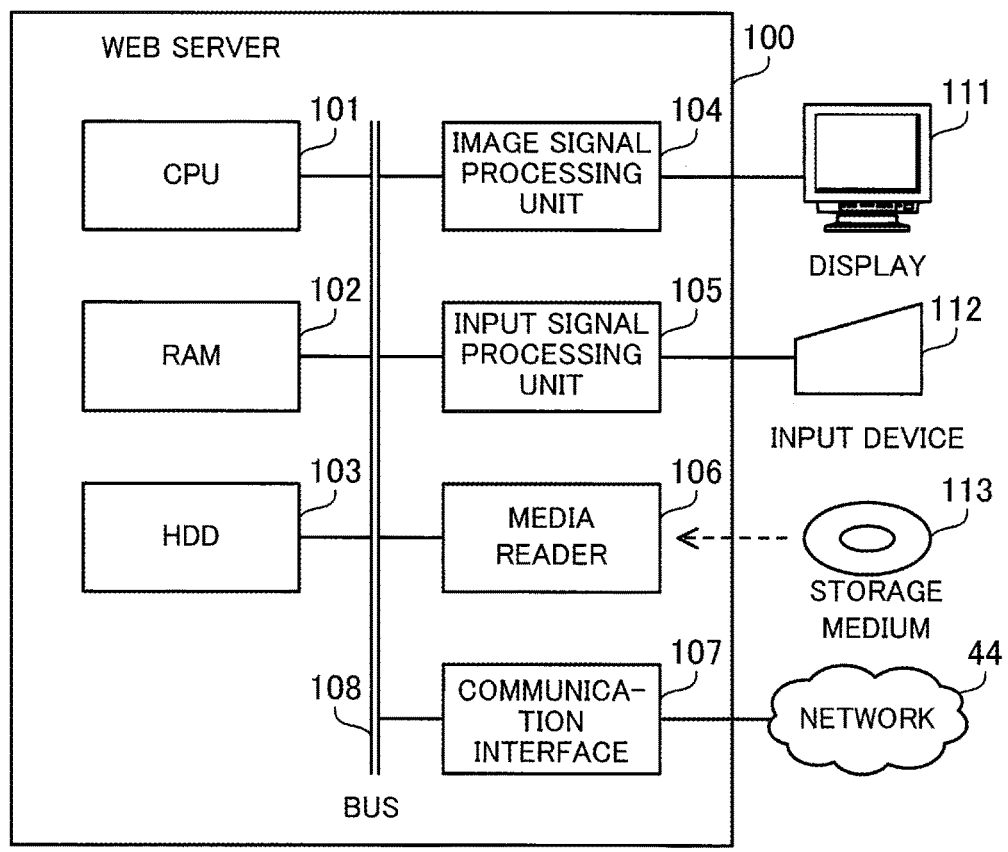
FIG. 3 is a block diagram illustrating an example of hardware of a Web server.

FIG. 3 is a block diagram illustrating an example of hardware of a Web server. The Web server 100 includes a CPU 101, RAM 102, a HDD 103, an image signal processing unit 104, an input signal processing unit 105, a media reader 106, and a communication interface 107. These units are connected to a bus 108. Note that the terminals 41, 42, 51, and 52, the DNS servers 43 and 53, the Web servers 100a and 100b, and the deployment planning server 200 may individually have the same hardware configuration as the Web server 100.

The CPU 101 is a processor including a computing circuit for carrying out program instructions. The CPU 101 loads at least part of a program and data stored in the HDD 103 into the RAM 102 to execute the program. Note that the CPU 101 may include a plurality of processor cores and the Web server 100 may include a plurality of processors, and processes to be described later may be executed in parallel using the plurality of processors or processor cores. In addition, a set of a plurality of processors (multiprocessor) may be referred to as the "processor".

The RAM 102 is volatile semiconductor memory for temporarily storing therein programs to be executed by the CPU 101 and data to be used by the CPU 101 for its computation. Note that the Web server 100 may be provided with a different type of memory other than RAM, or may be provided with a plurality of memory devices. The HDD 103 is a non-volatile memory device to store therein software programs, such as an operating system (OS), middleware, and application software, and various types of data. The programs include a session control program. Note that the Web server 100 may be provided with a different type of memory device, such as flash memory or a solid state drive (SDD), or may be provided with a plurality of non-volatile memory devices.

The image signal processing unit 104 outputs an image on a display 111 connected to the Web server 100 according to an instruction from the CPU 101. Various types of displays including the following may be used as the display 111: a cathode ray tube (CRT) display; a liquid crystal display (LCD); a plasma display panel (PDP); and an organic electro-luminescence (OEL) display. Note however that the display 111 may be integrally provided on the chassis of the Web server 100. The input signal processing unit 105 acquires an input signal from an input device 112 connected to the Web server 100 and sends the input signal to the CPU 101. Various types of input devices including the following may be used as the input device 112: a pointing device, such as a mouse, touch panel, touch-pad, or trackball; a keyboard; a remote controller; and a button switch. In addition, a plurality of types of input devices may be connected to the Web server 100. Note however that the input device 112 may be integrally provided on the chassis of the Web server 100.

The media reader 106 is a reader for reading programs and data recorded in a storage medium 113. As the storage medium 113, any of the following may be used: a magnetic disk, such as a flexible disk (FD) or HDD; an optical disk, such as a compact disc (CD) or digital versatile disc (DVD); a magneto-optical disk (MO); and semiconductor memory. The media reader 106 stores programs and data read from the storage medium 113, for example, in the RAM 102 or the HDD 103. The communication interface 107 is connected to a network 44 and communicates with other information processors via the network 44. The communication interface 107 may be a wired communication interface connected via a cable to a communication apparatus, such as a switch, or a wireless communication interface connected via a wireless link to a base station.

Figure 4:
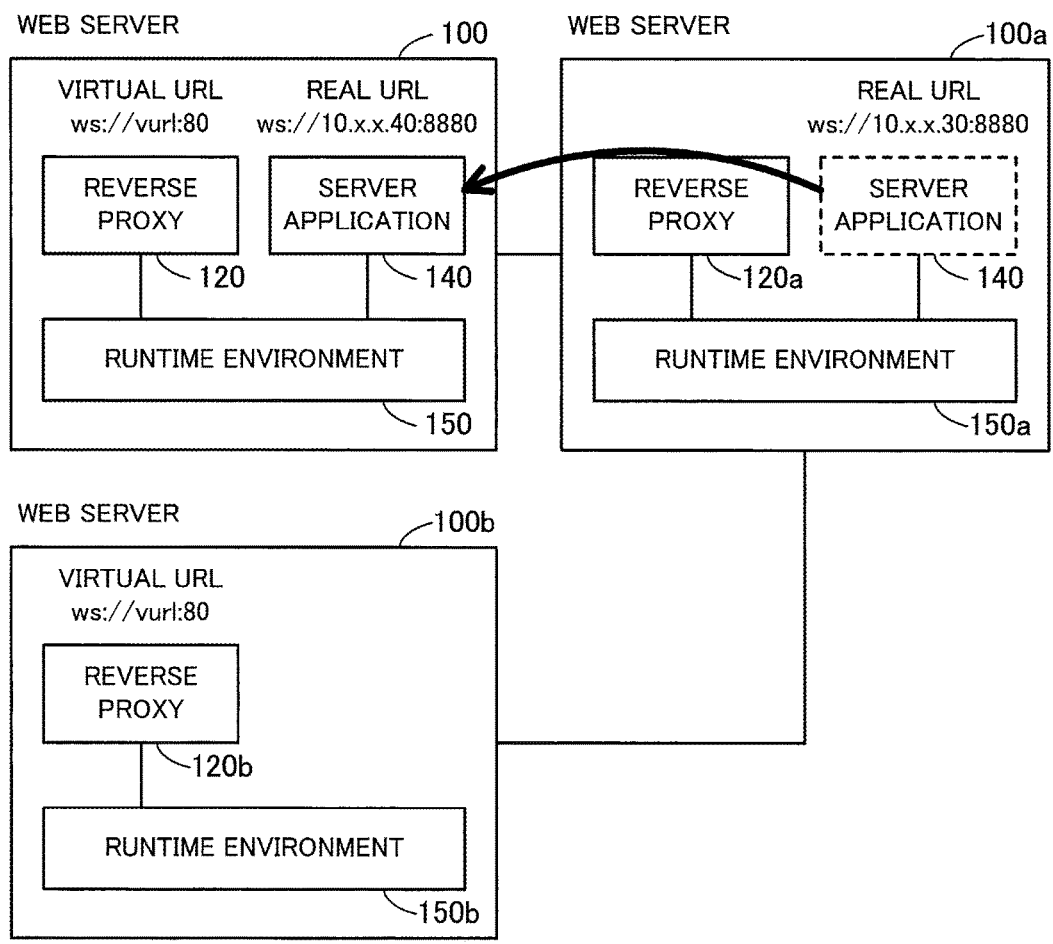
FIG. 4 illustrates a deployment example of a server application according to the second embodiment.

FIG. 4 illustrates a deployment example of a server application according to the second embodiment. The Web server 100 runs a reverse proxy 120 and a runtime environment 150. The Web server 100a runs a reverse proxy 120a and a runtime environment 150a. The Web server 100b runs a reverse proxy 120b and a runtime environment 150b. Now let us consider the case where a server application 140 is first deployed to the Web server 100a and subsequently migrated to the Web server 100. Note that, according to the second embodiment, the Web server 100a may not run the reverse proxy 120a because the reverse proxies 120 and 120b directly communicate with the server application 140.

The IP address of the Web server 100 is "10.x.x.40". The IP address of the Web server 100a is "10.x.x.30". The IP address of the Web server 100b is "10.x.x.50". When the server application 140 is deployed to the Web server 100a, the server application 140 is assigned a real URL including "ws://10.x.x.30:8880". When the server application 140 is deployed to the Web server 100, the server application 140 is assigned a real URL including "ws://10.x.x.40:8880". On the other hand, the reverse proxies 120 and 120b are individually assigned a virtual URL including "ws://vurl:80". The runtime environments 150, 150a, and 150b individually distribute received access requests according to their URLs. The runtime environment 150 transfers access requests each including "ws://vurl:80" to the reverse proxy 120. When the server application 140 is deployed to the Web server 100, the runtime environment 150 transfers access requests each including "ws://10.x.x.40:8880" to the server application 140. When the server application 140 is deployed to the Web server 100a, the runtime environment 150a transfers access requests each including "ws://10.x.x.30:8880" to the server application 140. The runtime environment 150b transfers access requests each including "ws://vurl:80" to the reverse proxy 120b.

Upon receiving such an access request including "ws://vurl:80", the reverse proxy 120/120b transfers the access request by converting the virtual URL to the real URL of the server application 140. Specifically, the reverse proxy 120/120b transfers the access request by converting "ws://vurl:80" to "ws://10.x.x.30:8880" in the case where the server application 140 is deployed to the Web server 100a. On the other hand, the reverse proxy 120/120b transfers the access request by converting "ws://vurl:80" to "ws://10.x.x.40:8880" in the case where the server application 140 is deployed to the Web server 100. This allows the access request with designation of the virtual URL to reach the server application 140.

The runtime environment 150/150a/150b directs the migration of the server application 140 according to an instruction from the deployment planning server 200. For example, the runtime environment of a migration-source Web server transmits the program of the server application 140 to the runtime environment of a migration-destination Web server. In addition, according to the second embodiment, the internal state of the server application 140 is also passed on to the migration-destination Web server in the migration of the server application 140. For this purpose, temporary data indicating the runtime state of the server application 140 is transmitted along with the program. Then, the runtime environment of the migration-source Web server stops the server application 140. On the other hand, the runtime environment of the migration-destination Web server starts the server application 140 based on the received program and data.

Note here that the terminals 41, 42, 51, and 52 and the Web servers 100, 100a, and 100b are able to use IP as a network-layer communication protocol. The terminals 41, 42, 51, and 52 and the Web servers 100, 100a, and 100b are also able to use TCP as a transport-layer communication protocol. Further, the terminals 41, 42, 51, and 52 and the Web servers 100, 100a, and 100b are able to use HTTP and WebSocket as higher-level communication protocols. The client applications of the terminals 41, 42, 51, and 52 and the server application 140 communicate with each other using the HTTP and WebSocket protocols.

Figure 5A:
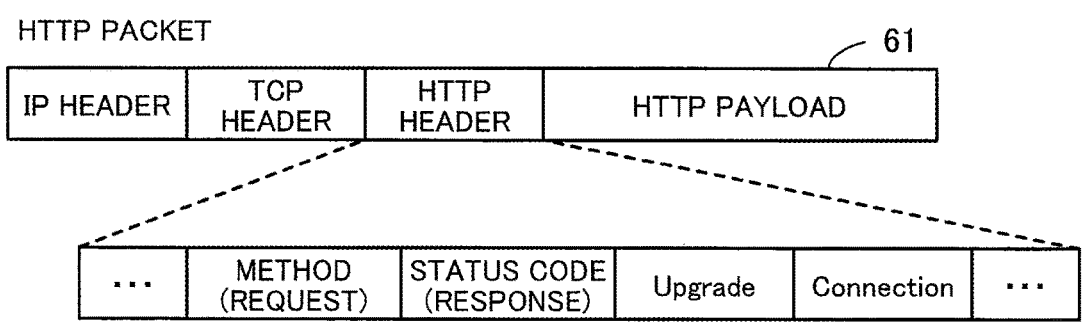
FIGS. 5A and 5B illustrate examples of a HTTP packet and a WebSocket packet, respectively.
Figure 5B:
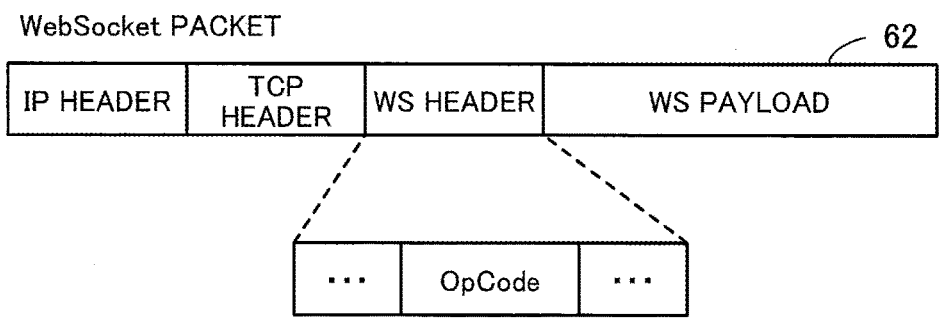

FIGS. 5A and 5B illustrate examples of a HTTP packet and a WebSocket packet. A HTTP packet 61 of FIG. 5A is transmitted over a TCP connection. The HTTP packet 61 includes an IP header, a TCP header, a HTTP header, and a HTTP payload. The IP header includes a destination IP address and a source IP address. The TCP header includes a destination port number and a source port number. The HTTP header includes Upgrade and Connection fields. If the HTTP packet 61 is a HTTP request, the HTTP header also includes a Method field. If the HTTP packet 61 is a HTTP response, the HTTP header includes a Status Code field. In the upstream direction, the HTTP payload includes POST data and, in the downstream direction, the HTTP payload includes data such as HyperText Markup Language (HTML) files.

The Method field includes a method, such as GET and POST, as well as a URL. For example, the GET method is used to request a server application identified by the URL for its content. The POST method is used to upload data to the server application identified by the URL. The Status Code field contains a processing result of the server application. For example, Status Code "200" indicates that the HTTP request has been processed normally. Status Code "101" indicates that the communication protocol is changed from HTTP to some other protocol. The Upgrade field specifies, in the case of switching a communication protocol, a communication protocol after the switch. The Connection field specifies how to handle the TCP connection after the HTTP message. For example, the Connection field set to "Close" indicates that the TCP connection is about to be closed. The Connection field set to "Upgrade" indicates to maintain the TCP connection and change a higher-level communication protocol over the TCP connection.

A WebSocket packet 62 of FIG. 5B is transmitted over a TCP connection. The WebSocket packet 62 includes an IP header, a TCP header, a WebSocket header (WS header), and a WebSocket payload (WS payload). The IP header and the TCP header are the same as those of the HTTP packet 61. The WebSocket header is light weight and small in size compared to a HTTP header, and includes an OpCode. The WebSocket payload includes data to be transmitted from one of a client application and a server application to the other. The OpCode indicates the form of the WebSocket payload and an instruction from the transmission source of the packet to its destination. The OpCode is 4 bits in length. For example, OpCode "0 (0x0)" indicates that the WebSocket payload is a continuation of the previous packet.

OpCode "1 (0x1)" indicates that the WebSocket payload contains text data. OpCode "2 (0x2)" indicates that the WebSocket payload contains binary data. OpCode "8 (0x8)" indicates the end (close) of the WebSocket communication. OpCode "9 (0x9)" indicates a ping message. OpCode "10 (0xA)" indicates a pong message (a response to the ping).

In the HTTP protocol, a TCP connection between a client application and a server application is closed each time transmission of a block of HTTP messages is completed. For example, after the client application transmits a HTTP request asking for a Web page and the server application then returns a HTTP response including data on the requested Web page, the TCP connection between them is closed. In the case of requesting another Web page, a new TCP connection needs to be established. On the other hand, in the WebSocket protocol, a TCP connection between a client application and a server application stays open, in principle, between the start and the end of the client application using the server application. A series of communication from the start of the use of the server application to the end is sometimes referred to as a WebSocket session (WS session). WebSocket may be used when small sets of data are frequently transmitted between the client application and the server application and when data is pushed from the server application to the client application. Chat applications are an example of such a server application.

For each of the client application and the server application, one WebSocket session corresponds to one TCP connection. Upon receiving a WebSocket message including OpCode "0x8" (i.e., a close notice) from a communication endpoint, the client application or the server application recognizes that the WebSocket session has been terminated or interrupted. Then, the client application or the server application closes a TCP connection corresponding to the WebSocket session. If the client application is to use again the services of the server application after receiving the close notice, a TCP connection needs to be established again with the server application. It is likely that the client application goes through operations, such as login procedures, on the TCP connection. In this regard, the client application may be able to reopen the previous WebSocket session (i.e., to take over the previous internal state), or may need to start a new WebSocket session because the previous WebSocket session has been terminated.

Figure 6:
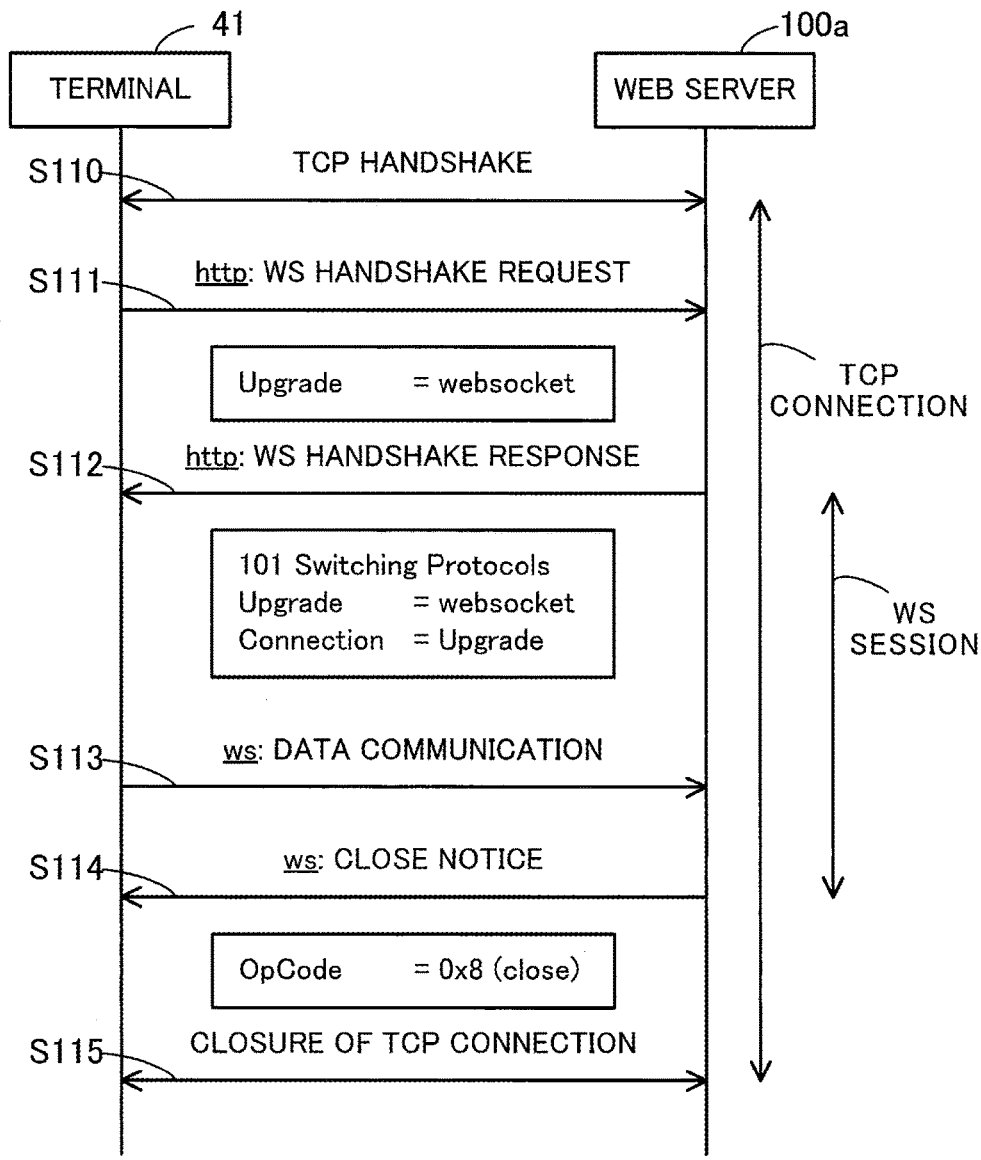
FIG. 6 is a sequence diagram illustrating a first example of WebSocket communication.

FIG. 6 is a sequence diagram illustrating a first example of WebSocket communication. Now let us consider the case where the server application 140 is deployed to the Web server 100*a* and the terminal 41 communicates with the Web server 100*a* in the WebSocket protocol. In addition, assume that the terminal 41 and the Web server 100*a* directly communicate with each other without the reverse proxy 120. For example, when the user of the terminal 41 enters the real URL of the server application 140, the communication illustrated in FIG. 6 takes place.

The terminal 41 establishes a TCP connection with the Web server 100*a* using the TCP three-way handshake (also called the TCP-handshake) (step S110). That is, the terminal 41 transmits a SYN packet (packet with SYN=1 and ACK=0) to the Web server 100*a*. In response, the Web server 100*a* transmits a SYN-ACK packet (packet with SYN=1 and ACK=1) to the terminal 41. Then, the terminal 41 transmits an ACK packet (packet with SYN=0 and ACK=1) to the Web server 100*a*. The SYN bit indicates a request for a connection, and the ACK bit indicates an acknowledgement response to the connection request.

The terminal 41 transmits a WebSocket handshake request to the Web server 100*a* over the TCP connection (step S111). The WebSocket handshake request is a HTTP request with the HTTP header containing the Upgrade field set to "websocket". Upon receiving the WebSocket handshake request, the Web server 100*a* transmits a WebSocket handshake response to the terminal 41 over the TCP connection (step S112). The WebSocket handshake response is a HTTP response with the HTTP header containing the Status Code field set to "101", the Upgrade field set to "websocket", and the Connection field set to "Upgrade". Note that the WebSocket handshake (WS handshake) is a procedure to allow WebSocket communication (i.e., to start a WebSocket session) over the TCP connection. The WebSocket handshake is also referred to as the Opening handshake. With the above-described steps, the WebSocket protocol, instead of HTTP, is used as an application-layer communication protocol between the terminal 41 and the Web serve 100*a* from this point forward. For example, the terminal 41 transmits WebSocket data to the Web server 100*a* over the TCP connection (step S113). On the other hand, the Web server 100*a* may transmit data to the terminal 41 with no need to wait for access from the terminal 41.

To end the WebSocket communication, the Web server 100*a* transmits a close notice to the terminal 41 over the TCP connection (step S114). The close notice is a WebSocket message with the WebSocket header containing the OpCode field set to "0x8", as described above. Upon receiving the close notice from the Web server 100a, the terminal 41 closes the TCP connection between the terminal 41 and the Web server 100a (step S115). That is, the terminal 41 transmits a FIN packet to the Web server 100a. In response, the Web server 100a returns a FIN packet to the terminal 41.

The TCP connection stays open from the TCP handshake in step S110 until the closure of the TCP connection in step S115. The WebSocket session established over the TCP connection is maintained from the completion of the WebSocket handshake in step S112 until the transmission of the close notice in step S114.

Figure 7:
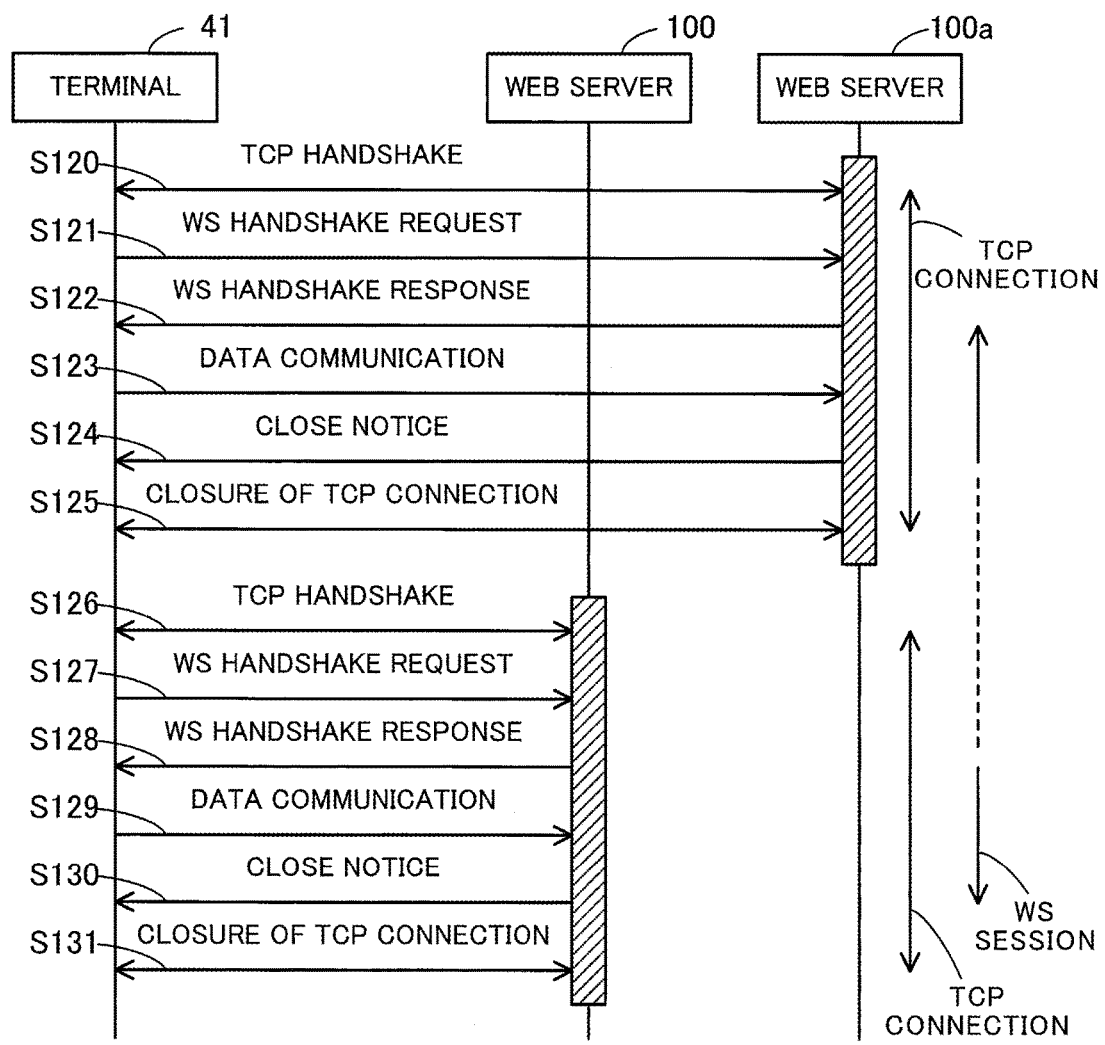
FIG. 7 is a sequence diagram illustrating a second example of the WebSocket communication.

Next described is a problem involved in migrating the server application 140 when the terminal 41 keeps a TCP connection open with the server application 140. FIG. 7 is a sequence diagram illustrating a second example of the WebSocket communication. Now let us consider the case where the server application 140 is first deployed to the Web server 100a and, then, migrated to the Web server 100. In addition, assume that the terminal 41 and the Web servers 100 and 100a directly communicate with each other without the reverse proxy 120, as in the case of FIG. 6.

The terminal 41 establishes a TCP connection between the terminal 41 and the Web server 100a by having a TCP handshake with the Web server 100a (step S120). The terminal 41 transmits, to the Web server 100a, a WebSocket handshake request using HTTP (step S121). The Web server 100a transmits, to the terminal 41, a WebSocket handshake response using HTTP (step S122). The terminal 41 transmits WebSocket data to the Web server 100a during the WebSocket session (step S123). Assume here that the deployment planning server 200 has decided to migrate the server application 140 from the Web server 100a to the Web server 100. The deployment planning server 200 issues, to the Web server 100a, an instruction on the migration of the server application 140. In response, the Web server 100a transmits a close notice to the terminal 41 because the current TCP connection is not to be maintained (step S124). Upon receiving the close notice, the terminal 41 closes the current TCP connection (step S125).

The terminal 41 sees the reception of the close notice as if services suddenly became unavailable (for example, as if the terminal 41 were forced to log out from the services) because of conditions on the server application 140 side. The client application of the terminal 41 informs the user that, for example, the services have become unavailable. If the user desires to use the services of the server application 140 again, the terminal 41 needs to access the Web server 100. On this occasion, the user of the terminal 41 may need to go through operations, such as entering a correct URL and logging in with its user identifier and password.

The terminal 41 establishes a TCP connection between the terminal 41 and the Web server 100 by having a TCP handshake with the Web server 100 (step S126). The terminal 41 transmits, to the Web server 100, a WebSocket handshake request using HTTP (step S127). The Web server 100 transmits, to the terminal 41, a WebSocket handshake response using HTTP (step S128). The terminal 41 transmits WebSocket data to the Web server 100 during the WebSocket session (step S129). In the case of ending the WebSocket session normally, the Web server 100 transmits a close notice to the terminal 41 (step S130). Upon receiving the close notice, the terminal 41 closes the TCP connection (step S131). Note however that the close notice may be transmitted from the terminal 41 to the Web server 100.

A single TCP connection is kept open from step S120 to step S125 while another TCP connection is kept open from step S126 to step S131. On the other hand, there is no TCP connection between steps S125 and S126. In addition, on the part of the terminal 41, the WebSocket session stays open from step S122 to step S124 and from step S128 to step S130. On the other hand, for the terminal 41, the WebSocket session is not available between steps S124 and S128. Note that this situation may sometimes appear to the terminal 41 as if a single WebSocket session ended in step S124 and a new WebSocket session started in step S128. Alternatively, for the terminal 41, a WebSocket session may apparently have been interrupted in step S124 and, then, reopened in step S128.

Thus, the migration of the server application 140 performing WebSocket communication may impair the convenience of the user of the terminal 41. In view of the problem, the second embodiment is directed to using the reverse proxy 120 to thereby hide the TCP connection closure from the terminal 41, thus making the WebSocket session appear to stay open during the migration of the server application 140.

Figure 8:
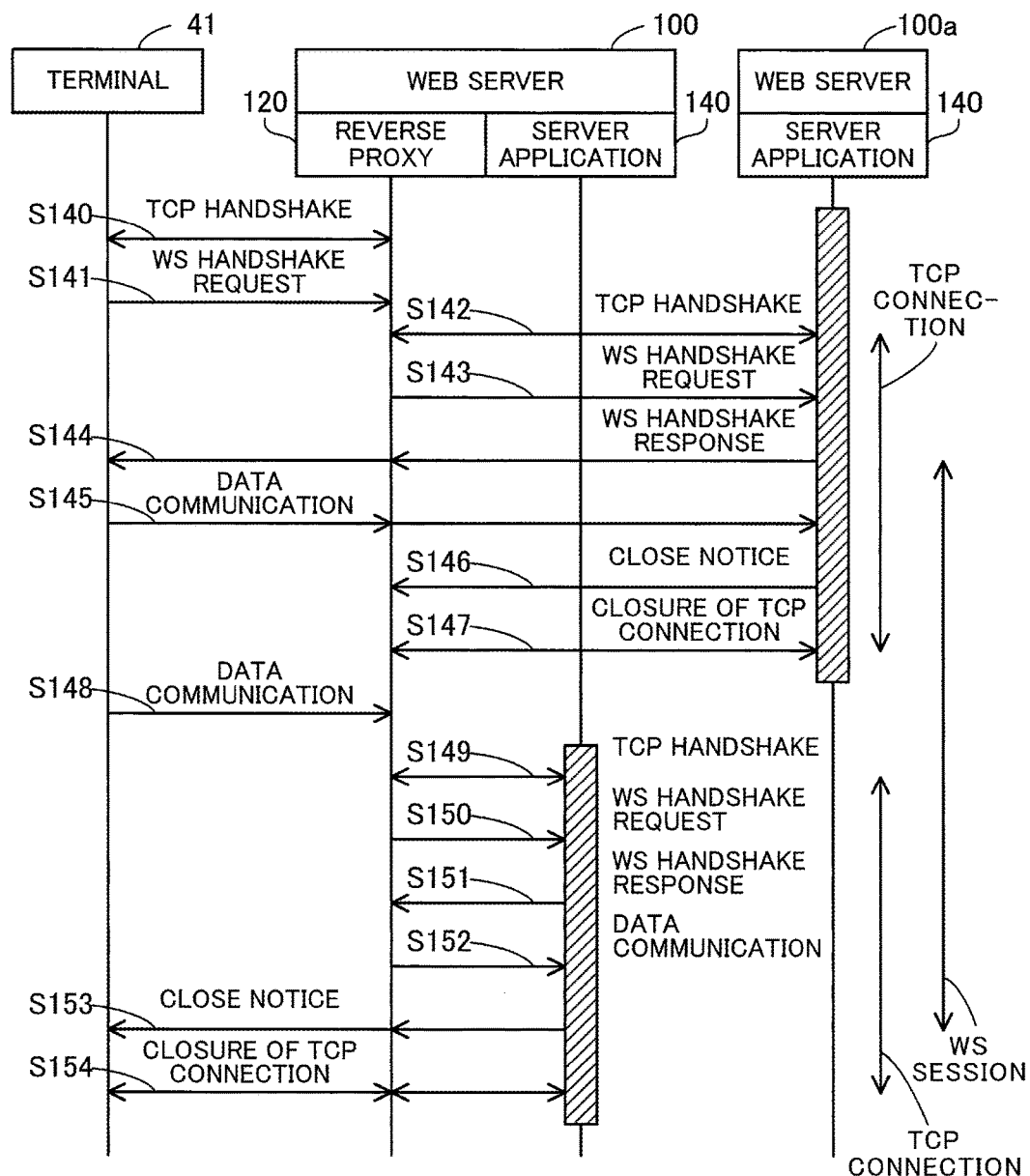
FIG. 8 is a sequence diagram illustrating a third example of the WebSocket communication.

FIG. 8 is a sequence diagram illustrating a third example of the WebSocket communication. Assume here that the server application 140 is first deployed to the Web server 100a and, then, migrated to the Web server 100, as in FIG. 7. Note here that the terminal 41 communicates with the server application 140 via the reverse proxy 120. The terminal 41 establishes a TCP connection between the terminal 41 and the reverse proxy 120 by having a TCP handshake with the reverse proxy 120 (step S140). The terminal 41 transmits, to the reverse proxy 120, a WebSocket handshake request with designation of the virtual URL of the server application 140 (step S141). The reverse proxy 120 converts the virtual URL to the real URL of the server application 140.

The reverse proxy 120 establishes a TCP connection between the reverse proxy 120 and the server application 140 deployed to the Web server 100a by having a TCP handshake with the server application 140 (step S142). The reverse proxy 120 transmits, to the server application 140, a WebSocket handshake request with designation of the real URL of the server application 140 (step S143). The server application 140 transmits a WebSocket handshake response to the reverse proxy 120. The reverse proxy 120 transfers the WebSocket handshake response to the terminal 41 (step S144). The terminal 41 transmits WebSocket data to the reverse proxy 120, which then transfers the WebSocket data to the server application 140 (step S145).

Assume here that the deployment planning server 200 has decided to migrate the server application 140 from the Web server 100a to the Web server 100. The deployment planning server 200 issues a migration instruction to the server application 140. In response, the server application 140 transmits a close notice to the reverse proxy 120 (step S146). The reverse proxy 120 terminates the received close notice. That is, the reverse proxy 120 discards the close notice without transferring it to the terminal 41. Note that, as described later, the reverse proxy 120 terminates the close notice only when it has received a migration start notice from the deployment planning server 200. In cases other than this, the reverse proxy 120 transfers the close notice to the terminal 41 as with the case of a normal WebSocket message.

Upon receiving the close notice, the reverse proxy 120 closes the TCP connection between the reverse proxy 120 and the server application 140 (step S147). On the other hand, the reverse proxy 120 does not close the TCP connection between the terminal 41 and the reverse proxy 120. Because the close notice is not transferred to the terminal 41, the terminal 41 also does not close the TCP connection. As recognizing the WebSocket session staying open, the terminal 41 transmits WebSocket data to the reverse proxy 120 (step S148). The reverse proxy 120 saves the received data in a buffer because a TCP connection is not present between the reverse proxy 120 and the server application 140.

Then, upon receiving a migration completion notice (to be described later) from the deployment planning server 200, the reverse proxy 120 establishes a TCP connection by having a TCP handshake with the server application 140 having migrated to the Web server 100 (step S149). The TCP connection is a connection established inside the Web server 100. The reverse proxy 120 transmits a WebSocket handshake request to the server application 140 (step S150). In response, the server application 140 transmits a WebSocket handshake response to the reverse proxy 120 (step S151). The reverse proxy 120 transfers the data stored in the buffer to the server application 140 (step S152). Note that, when the server application 140 is migrated from the Web server 100a to the Web server 100 as described above, temporary data indicating the state of the WebSocket session ("session data") is also migrated. This allows the server application 140 to take over a set of circumstances (i.e., context) prior to the transmission of the close notice in step S146.

In the case of ending the WebSocket session normally, the server application 140 transmits a close notice to the reverse proxy 120. Because of not having received a migration start notice from the deployment planning server 200, the reverse proxy 120 transfers the close notice to the terminal 41, as with the case of a normal WebSocket message (step S153). In addition, the reverse proxy 120 closes the TCP connection between the reverse proxy 120 and the server application 140. Upon receiving the close notice, the terminal 41 closes the TCP connection between the terminal 41 and the reverse proxy 120 (step S154).

On the part of the server application 140, a single TCP connection is kept open from step S142 to step S147 while another TCP connection is kept open from step S149 to step S154. However, for the server application 140, there is no TCP connection between steps S147 and S149. On the other hand, on the part of the terminal 41, a TCP connection stays open without a connection closure from step S140 to step S154. In addition, for the terminal 41, a Websocket session appears to stay open from step S144 to step S153. Further, along with the migration of the server application 140, the session data is also migrated. This allows the terminal 41 to continue the communication with no regard to the migration of the server application 140.

Figure 9:
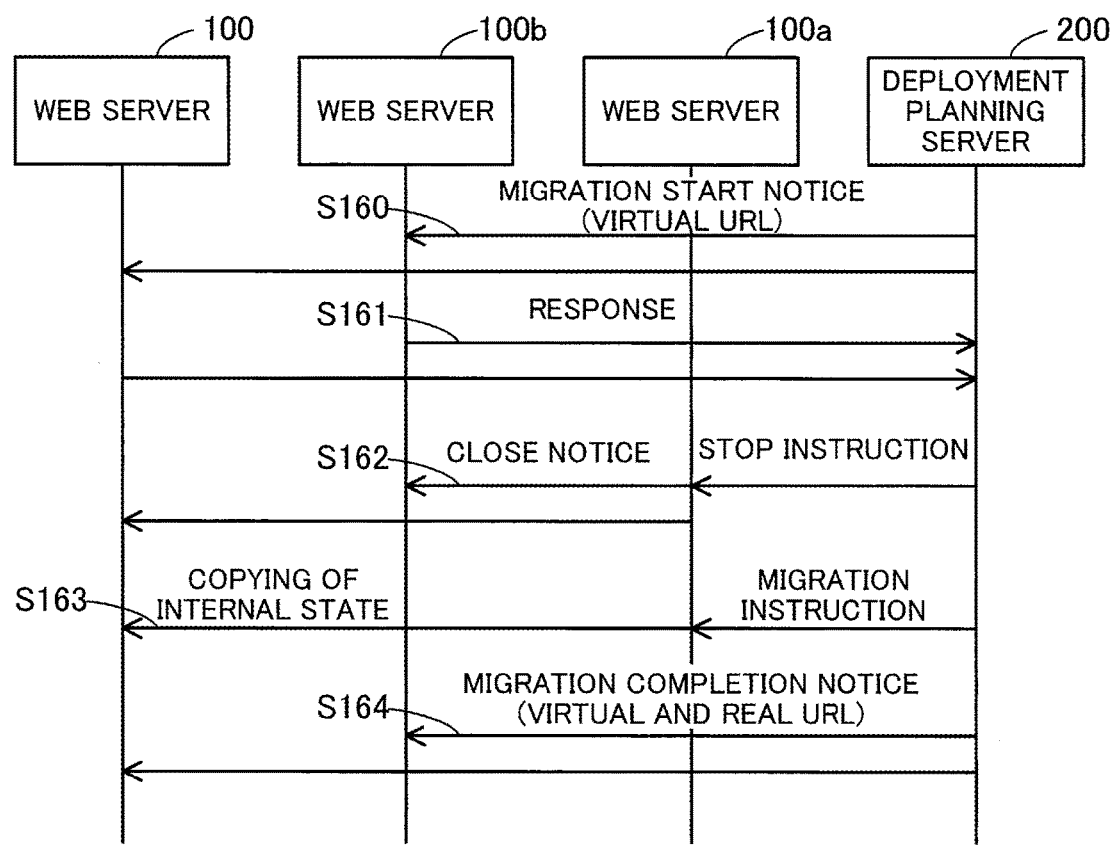
FIG. 9 is a sequence diagram illustrating an example of migration control communication according to the second embodiment.

FIG. 9 is a sequence diagram illustrating an example of migration control communication according to the second embodiment. The deployment planning server 200 decides to migrate the server application 140 from the Web server 100a to the Web server 100. Then, the deployment planning server 200 transmits migration start notices to the reverse proxies 120 and 120 of the Web servers 100 and 100b, respectively (step S160). Each of the migration start notices includes a virtual URL identifying the server application 140 to be migrated. The reverse proxies 120 and 120b transmit responses to the migration start notices to the deployment planning server 200 (step S161).

The deployment planning server 200 transmits a stop instruction to the server application 140. The server application 140 transmits a close notice with respect to each TCP connection open for WebSocket communication (step S162). For example, the server application 140 transmits one or two or more close notices to the reverse proxies 120 and 120b. The close notices correspond to the close notice sent in step S146 of FIG. 8. The deployment planning server 200 transmits a migration instruction to the runtime environment 150a of the Web server 100a. The runtime environment 150a transmits, to the Web server 100, the program of the server application 140 and the session data indicating the internal state thereof (step S163). The runtime environment 150a stops the server application 140. The runtime environment 150 of the Web server 100 starts the server application 140 using the program and session data.

The deployment planning server 200 transmits migration completion notices to the reverse proxies 120 and 120b (step S164). Each of the migration completion notices includes the virtual URL of the server application 140 so that the server application 140 having been migrated is identified. In addition, the migration completion notices each include a post-migration real URL of the server application 140 (which is different from one before the migration) so that messages are transferred to the server application 140.

Figure 10:
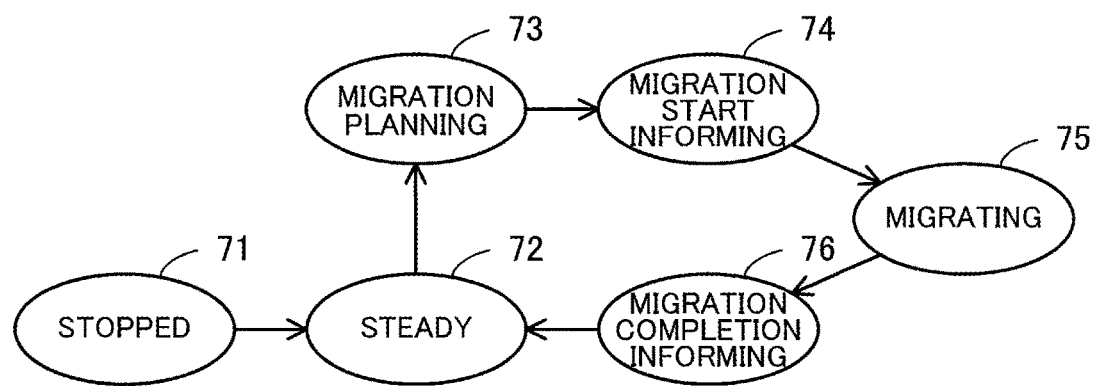
FIG. 10 illustrates an example of state transitions of a deployment planning server.
Figure 11:
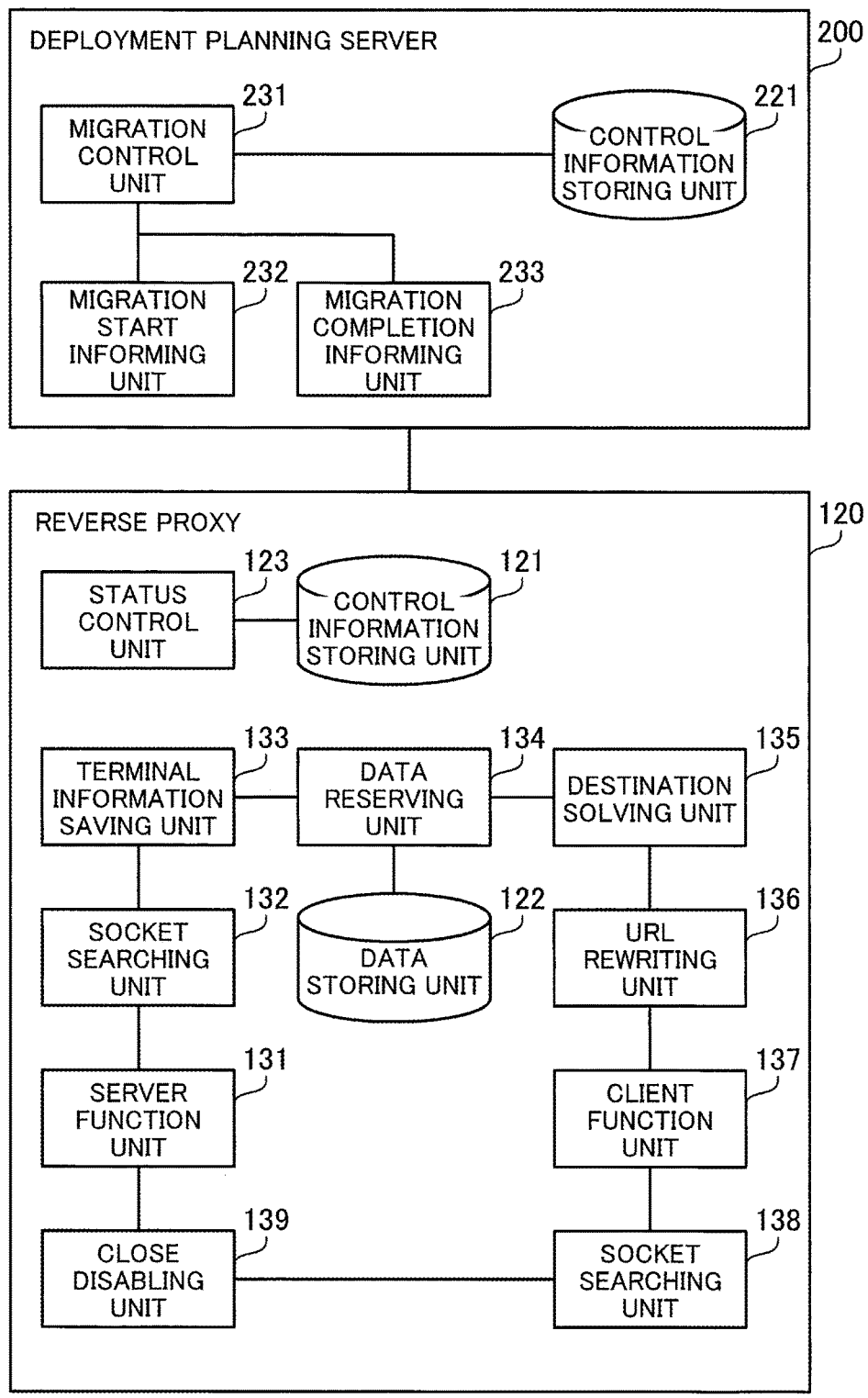
FIG. 11 is a block diagram illustrating an example of functions of a reverse proxy according to the second embodiment.

FIG. 10 illustrates an example of state transitions of the deployment planning server. The deployment planning server 200 is first in a stopped state 71 where the deployment planning server 200 has yet to be started. When being started, the deployment planning server 200 shifts from the stopped state 71 to a steady state 72. The steady state 72 is a state where the deployment planning server 200 maintains current server application deployment. The deployment planning server 200 in the steady state 72 collects workload information indicating workload on the Web servers 100, 100a, and 100b and communication delay time of each server application.

When having determined the need to migrate a server application based on the workload information, the deployment planning server 200 shifts from the steady state 72 to a migration planning state 73. The deployment planning server 200 in the migration planning state 73 determines on a migration plan indicating the server application to be migrated and a migration-destination Web server. When having determined on the migration plan, the deployment planning server 200 then shifts from the migration planning state 73 to a migration start informing state 74.

The deployment planning server 200 in the migration start informing state 74 transmits migration start notices to individual reverse proxies and then waits for responses to the migration start notices. Upon receiving the responses from all the reverse proxies, the deployment planning server 200 shifts from the migration start informing state 74 to a migrating state 75. The deployment planning server 200 in the migrating state 75 transmits a stop instruction to the server application to be migrated. In addition, the deployment planning server 200 transmits a migration instruction to a migration-source Web server.

When the migration of the server application is completed, the deployment planning server 200 shifts from the migrating state 75 to a migration completion informing state 76. The deployment planning server 200 in the migration completion informing state 76 transmits migration completion notices to the individual reverse proxies. Then, the deployment planning server 200 shifts from the migration completion informing state 76 to the steady state 72. Thus, the deployment planning server 200 continuously re-examines the deployment of server applications to thereby optimize the server application deployment to the Web servers 100, 100a, and 100b.

Next described are functions of the reverse proxies 120 and 120b. The following gives a description of only the reverse proxy 120 as a representative since the reverse proxy 120b has the same functions as the reverse proxy 120. FIG.

11 is a block diagram illustrating an example of functions of the reverse proxy according to the second embodiment. The reverse proxy 120 includes a control information storing unit 121, a data storing unit 122, and a status control unit 123. The reverse proxy 120 also includes a server function unit 131, a socket searching units 132 and 138, a terminal information saving unit 133, a data reserving unit 134, a destination solving unit 135, a URL rewriting unit 136, a client function unit 137, and a close disabling unit 139. Each of the control information storing unit 121 and the data storing unit 122 is implemented as a storage area allocated, for example, in the RAM 102 or the HDD 103. The remaining units are implemented, for example, as modules of a program executed by the CPU 101.

The control information storing unit 121 stores therein various types of control information used to transfer HTTP messages and WebSocket messages. Details of the control information are described later. The data storing unit 122 is a buffer to temporarily store messages received from the terminals 41 and 42 during migration of the server application 140. The status control unit 123 receives, from the deployment planning server 200, various notices such as a migration start notice and a migration completion notice. In response to a received notice, the status control unit 123 updates the control information stored in the control information storing unit 121.

The server function unit 131 acts, to the terminals 41 and 42, as if it were a server application. In response to a request from each of the terminals 41 and 42, the server function unit 131 establishes a TCP connection with the terminal. For each TCP connection, the server function unit 131 generates a socket which is a logical communication interface. The server function unit 131 differentiates TCP connections according to numbers assigned to their sockets. The server function unit 131 receives messages through the sockets (i.e., from the terminals 41 and 42). In addition, the server function unit 131 designates a corresponding socket to transmit a message to the terminal 41/42.

When the server function unit 131 receives a message, the socket searching unit 132 searches the control information stored in the control information storing unit 121 for a socket on the client function unit 137 side, corresponding to a socket through which the message has been received. The socket to be searched for is one corresponding to a TCP connection between the reverse proxy 120 and the server application 140. If the received message is a HTTP message, the terminal information saving unit 133 saves the HTTP header in the control information storing unit 121.

The data reserving unit 134 refers to the control information stored in the control information storing unit 121, to determine whether the server application 140 is migrating. If the server application 140 is migrating, the data reserving unit 134 saves a received message in the data storing unit 122. Then, when the migration of the server application 140 is completed, the data reserving unit 134 takes out the message stored in the data storing unit 122 as a message to be transferred to the server application 140. Note however that if the stored message is a WebSocket message, the data reserving unit 134 generates a WebSocket handshake request as a HTTP message to be transmitted to the server application 140 before transferring the WebSocket message. As for the transmission of the WebSocket handshake request, the reverse proxy 120 acts as if it were the terminal 41/42 and, therefore, the HTTP header saved by the terminal information saving unit 133 is added to the WebSocket handshake request.

If the message to be transferred is a HTTP message, the destination solving unit 135 searches the control information stored in the controlling information storing unit 121 for a real URL corresponding to a virtual URL included in the HTTP message. If the message to be transferred is a WebSocket message, the destination solving unit 135 searches the control information stored in the control information storing unit 121 for a socket on the client function unit 137 side, to be used for communication with the server application 140. The URL rewriting unit 136 rewrites the virtual URL included in the HTTP message into the real URL found by the destination solving unit 135.

The client function unit 137 acts, to the server application 140, as if it were a client application. The client function unit 137 establishes a TCP connection with the server application 140. For each TCP connection, the client function unit 137 generates a socket which is a logical communication interface. The client function unit 137 transmits a message by designating the socket (so that the message is sent to the server application 140). In addition, the client function unit 137 receives a message through the socket (from the server application 140).

Note that the reverse proxy 120 determines in advance the range of socket numbers usable by the server function unit 131 and those usable by the client function unit 137. Herewith, based on the number of a socket through which a message has been received, the reverse proxy 120 is able to determine whether the received message is to be processed by the server function unit 131 or the client function unit 137.

When the client function unit 137 receives a message, the socket searching unit 138 searches the control information stored in the control information storing unit 121 for a socket on the server function unit 131 side, corresponding to a socket through which the message has been received. The close disabling unit 139 refers to the control information stored in the control information storing unit 121, to determine whether the received message is a WebSocket message and if the server application 140 is migrating. That is, the close disabling unit 139 determines whether the received message is a close notice issued in association with migration of the server application 140. If having determined that the condition above is satisfied, the close disabling unit 139 terminates the received close notice. That is, the close disabling unit 139 discards the close notice without outputting it to the server function unit 131. Note that, in the case of receiving a close notice, the client function unit 137 closes the TCP connection with the server application 140 and deletes the corresponding socket.

The deployment planning server 200 includes a control information storing unit 221, a migration control unit 231, a migration start informing unit 232, and a migration completion informing unit 233. The control information storing unit 221 is implemented as a storage area allocated, for example, in RAM or a HDD. The migration control unit 231, the migration start informing unit 232, and the migration completion informing unit 233 are implemented, for example, as modules of a program executed by a CPU.

The control information storing unit 221 stores therein various types of control information used to control migration of the server application 140. Details of the control information are described later. The migration control unit 231 monitors workload on the Web servers 100, 100a, and 100b and communication delay of the server application 140. If the workload and communication delay satisfy predetermined conditions, the migration control unit 231 decides on migration of the server application 140 and a migration-destination Web server. The migration start informing unit 232 transmits migration start notices to the reverse proxies 120 and 120b before the start of migration of the server application 140. The migration completion informing unit 233 transmits migration completion notices to the reverse proxies 120 and 120b when the migration of the server application 140 is completed.

FIG. 12 illustrates an example of control tables held by a reverse proxy. The control information storing unit 121 stores therein a terminal information table 124, a socket mapping table 125, a migration management table 126, and a URL mapping table 127. The terminal information table 124 includes columns of terminal-side socket and HTTP header. Each field in the terminal-side socket column contains the number of a socket on the server function unit 131 side. Each field in the HTTP header column contains the HTTP header included in a HTTP message received through the corresponding socket in the terminal-side socket column. In the case where a plurality of HTTP messages have been received through a single socket, the field in the HTTP header needs to contain only the HTTP header included in the latest HTTP message.

The socket mapping table 125 includes columns of the following items: terminal-side socket; upgrade status; server-side socket; and pointer. Each field in the terminal-side socket column contains the number of a socket on the server function unite 131 side. Each field in the upgrade status column contains the flag indicating whether a communication protocol of the corresponding socket in the terminal-side socket column has been upgraded from HTTP to WebSocket. The initial entry of the upgrade status is "FALSE". The upgrade status set to "FALSE" indicates that the communication protocol is HTTP. The upgrade status set to "TRUE" indicates that the communication protocol is WebSocket. Each field in the server-side socket column contains the number of a socket on the client function unit 137 side. Each socket on the client function unit 137 side is associated with a single socket on the server function unit 131 side. That is, within the reverse proxy 120, each TCP connection on the server application 140 side is associated with a single TCP connection on the terminals 41 and 42 side. Each field in the pointer column contains the identification information indicating one record in the migration management table 126. As the identification information, an index in the migration management table 126 (to be described below) is used.

The migration management table 126 includes columns of the following items: index; virtual URL; and migration status. Each field in the index column contains the number for identifying one record in the migration management table 126. The corresponding field in the virtual URL column illustrated in FIG. 12 contains the virtual URL assigned to the server application 140. The virtual URL is decided, for example, by the deployment planning server 200. The corresponding field in the migration status column illustrated in FIG. 12 contains the flag indicating whether the server application 140 is migrating. The initial entry of the migration status is "FALSE". The migration status set to "FALSE" indicates that the server application 140 is not migrating. The migration status set to "TRUE" indicate that the server application 140 is migrating.

The URL mapping table 127 includes columns of virtual URL and real URL. The field in the virtual URL column illustrated in FIG. 12 contains the virtual URL assigned to the server application 140. The corresponding field in the real URL column contains the real URL assigned to the server application 140. The real URL depends on a Web server to which the server application 140 is deployed.

Figure 13:
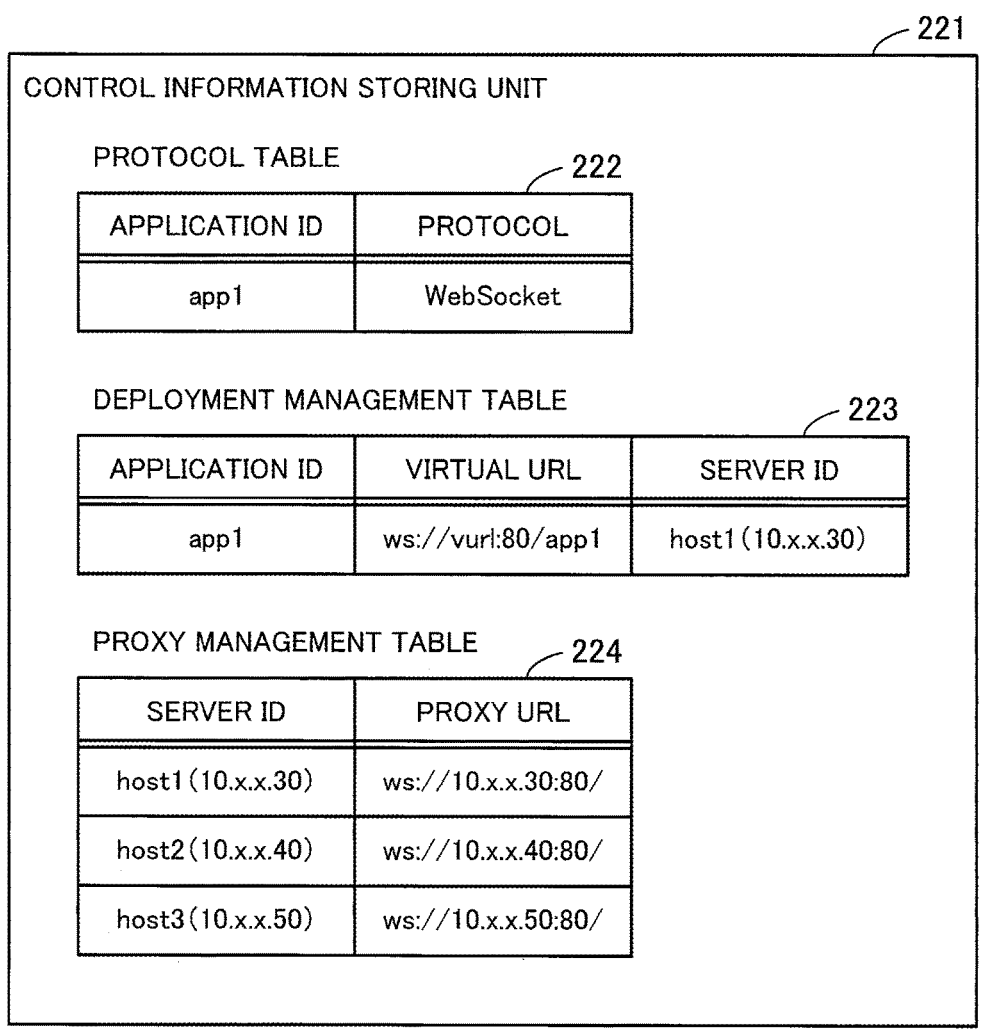
FIG. 13 illustrates an example of control tables held by the deployment planning server.

FIG. 13 illustrates an example of control tables held by the deployment planning server. The control information storing unit 221 stores therein a protocol table 222, a deployment management table 223, and a proxy management table 224. The protocol table 222 includes columns of application identifier (ID) and protocol. The field in the application identifier column illustrated in FIG. 13 contains the identification information for identifying the server application 140. The application identifier may be a path name included in the virtual or real URL. The corresponding field in the protocol column contains the name of an application-layer communication protocol available for the server application 140. When the server application 140 is allowed to use WebSocket, the field in the protocol column contains "WebSocket".

The deployment management table 223 includes columns of the following items: application identifier (ID); virtual URL; and server identifier (ID). The field in the application identifier column illustrated in FIG. 13 contains the identification information for identifying the server application 140. The corresponding field in the virtual URL column contains the virtual URL assigned to the server application 140. The corresponding field in the server identifier column contains the identification information for identifying a Web server to which the server application 140 is deployed. The server identifier may be the host name or IP address of the Web server.

The proxy management table 224 includes columns of server identifier (ID) and proxy URL. Each field in the server identifier column contains the identification information for identifying a Web server on which one of the reverse proxies 120, 120a, and 120b is installed. The server identifier may be the host name or IP address of the corresponding Web server. Each field in the proxy URL column contains the real URL assigned to the corresponding reverse proxy. Note that, according to the second embodiment, the reverse proxies 120 and 120b are not informed of the real URLs of the individual reverse proxies because each of the reverse proxies 120 and 120b directly communicates with the server application 140.

Figure 14:
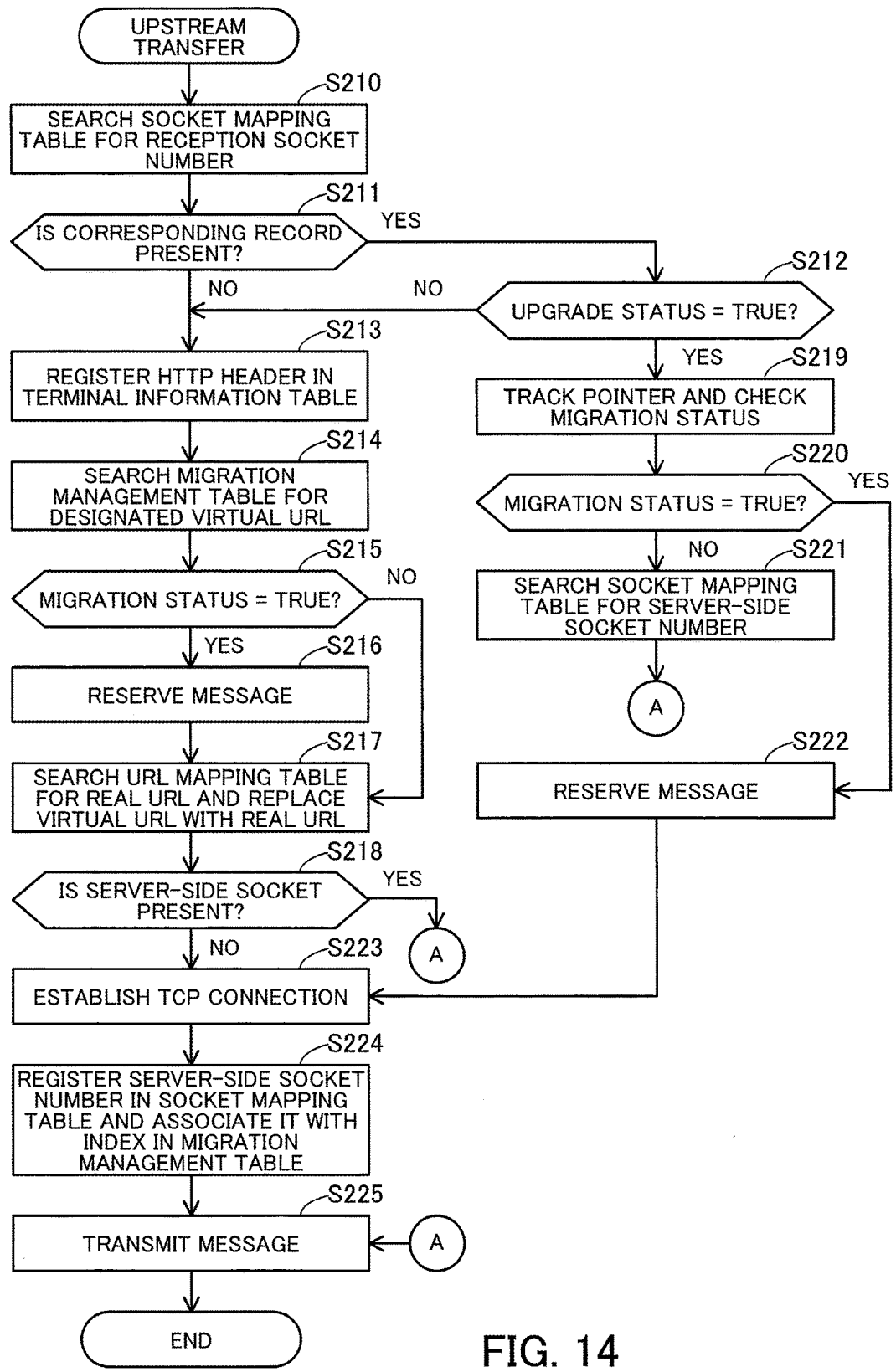
FIG. 14 is a flowchart illustrating an example of an upstream transfer procedure.

Next described is a processing procedure of the reverse proxy 120. The reverse proxy 120b may perform the same process as the reverse proxy 120. FIG. 14 is a flowchart illustrating an example of an upstream transfer procedure.

(Step S210) The server function unit 131 receives a message. The socket searching unit 132 searches the socket mapping table 125 for a record including, as the terminal-side socket, the number of a socket through which the message has been received ("reception socket number").

(Step S211) The socket searching unit 132 determines whether the corresponding record has been found in step S210. If the corresponding record has been found, the process moves to step S212. If not, the process moves to step S213.

(Step S212) The socket searching unit 132 determines whether the upgrade status included in the found record is TRUE. If the upgrade status is TRUE, the process moves to step S219. If it is FALSE, the process moves to step S213.

(Step S213) The terminal information saving unit 133 determines that the received message is a HTTP message. The terminal information saving unit 133 registers, in the terminal information table 124, the HTTP header included in the received HTTP message in association with the reception socket number.

(Step S214) The data reserving unit 134 extracts a URL designated by the received HTTP message (virtual URL). The data reserving unit 134 searches the migration management table 126 for a record including the extracted virtual URL.

(Step S215) The data reserving unit 134 determines whether the migration status included in the record found in step S214 is TRUE. If the migration status is TRUE, the process moves to step S216. If it is FALSE, the process moves to step S217.

(Step S216) The data reserving unit 134 stores the received HTTP message in the data storing unit 122 and puts the transfer on hold. The data reserving unit 134 monitors the migration status of the record found in step S214 and waits for the migration status to change from TRUE to FALSE.

(Step S217) The destination solving unit 135 extracts the virtual URL designated by the HTTP message. The destination solving unit 135 searches the URL mapping table 127 for a real URL corresponding to the extracted virtual URL. The URL rewriting unit 136 replaces the virtual URL included in the HTTP message with the found real URL.

(Step S218) The client function unit 137 searches the socket mapping table 125 for a record including the reception socket number as the terminal-side socket. The client function unit 137 determines whether a server-side socket has already been registered in the found record. If the server-side socket has already been registered, the process moves to step S225. If not, the process moves to step S223.

(Step S219) The data reserving unit 134 determines that the received message is a WebSocket message. The data reserving unit 134 tracks the pointer included in the record found in step S210, and acquires a record pointed by the pointer from the migration management table 126. The data reserving unit 134 checks the migration status included in the acquired record.

(Step S220) The data reserving unit 134 determines whether the migration status checked in step S219 is TRUE. If the migration status is TRUE, the process moves to step S222. If it is FALSE, the process moves to step S221.

(Step S221) The destination solving unit 135 searches the socket mapping table 125 for a record including the reception socket number as the terminal-side socket. The destination solving unit 135 acquires a socket number included in the found record as the server-side socket ("server-side socket number"). Then, the process moves to step S225.

(Step S222) The data reserving unit 134 stores the received WebSocket message in the data storing unit 122 and puts the transfer on hold. The data reserving unit 134 monitors the migration status of the record acquired in step S219 and waits for the migration status to change from TRUE to FALSE.

(Step S223) The client function unit 137 establishes a TCP connection with a server application to which the message is to be transferred and generates a server-side socket. The TCP connection is established by the TCP three-way handshake. That is, the client function unit 137 transmits a SYN packet, receives a SYN-ACK packet, and then transmits an ACK packet. As the destination IP address of the SYN packet, an IP address mapped by the Domain Name System (DNS) based on a host name included in the real URL, or an IP address included in the real URL is used. As the destination port number of the SYN packet, a port number included in the real URL (a port number of "80" in the case where the port number is omitted) is used.

(Step S224) The client function unit 137 registers, in the socket mapping table 125, the number of the server-side socket generated in step S223 in association with the reception socket number. In addition, the client function unit 137 determines whether no pointer exists which corresponds to the registered server-side socket number (i.e., whether the record is newly added this time). If no pointer exists, the client function unit 137 registers, in the socket mapping table 125, the index included in the record found in the migration management table 126 in step S214 as the pointer corresponding to the registered server-side socket number.

(Step S225) The client function unit 137 transmits the message using the socket found in step S218, the socket generated in step S223, or the socket found in step S221. Note that, as described later, the message to be transmitted here may be not the message received by the server function unit 131, but a WebSocket handshake request generated by the data reserving unit 134.

Figure 15:
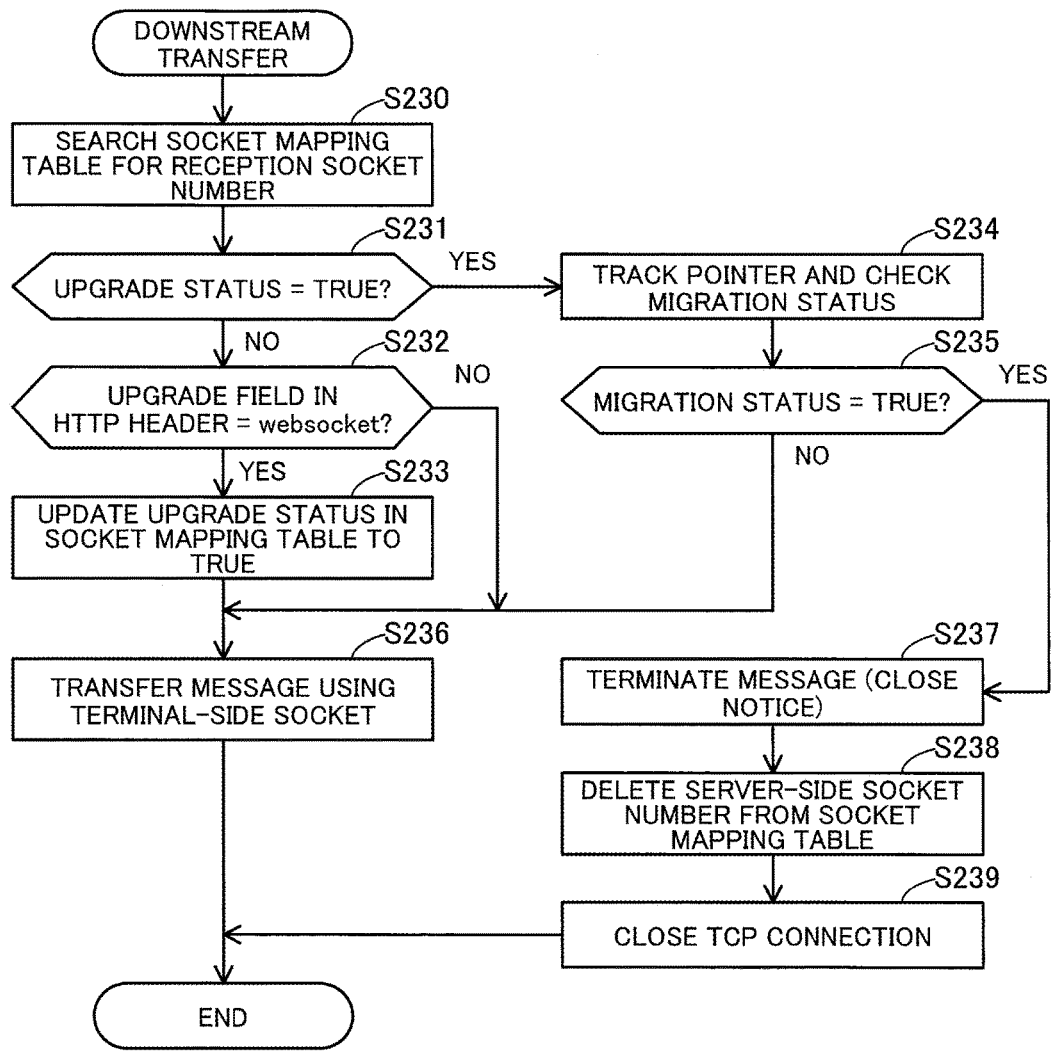
FIG. 15 is a flowchart illustrating an example of a downstream transfer procedure.

FIG. 15 is a flowchart illustrating an example of a downstream transfer procedure.

(Step S230) The client function unit 137 receives a message. The socket searching unit 138 searches the socket mapping table 125 for a record including, as the server-side socket, the number of a socket through which the message was received ("reception socket number").

(Step S231) The close disabling unit 139 determines whether the upgrade status included in the found record is TRUE. If the upgrade status is TRUE, the process moves to step S234. If it is FALSE, the process moves to step S232.

(Step S232) The server function unit 131 determines that the received message is a HTTP message. The server function unit 131 extracts, from the HTTP header included in the received HTTP message, the Upgrade field and then determines whether the Upgrade field is set to "websocket". If the Upgrade field is set to "websocket", the process moves to step S233. If not, the process moves to step S236.

(Step S233) The server function unit 131 updates the upgrade status included in the record found in step S230 to TRUE. Then, the process moves to step S236.

(Step S234) The close disabling unit 139 determines that the received message is a WebSocket message. The close disabling unit 139 tracks the pointer included in the record found in step S230, and acquires a record pointed by the pointer from the migration management table 126. The close disabling unit 139 checks the migration status included in the acquired record.

(Step S235) The close disabling unit 139 determines whether the migration status checked in step S234 is TRUE. If the migration status is TRUE, the process moves to step S237. If it is FALSE, the process moves to step S236.

(Step S236) The server function unit 131 transfers the message using a terminal-side socket indicated by the record found in step S230. Then, the downstream transfer ends.

(Step S237) The close disabling unit 139 terminates the received WebSocket message (which is a close notice). That is, the close disabling unit 139 discards the close notice without outputting it to the server function unit 131.

(Step S238) The server function unit 131 deletes, from the socket mapping table 125, the server-side socket number included in the record found in step S230.

(Step S239) The client function unit 137 closes a TCP connection corresponding to the socket through which the WebSocket message has been received. That is, the client function unit 137 transmits a FIN packet with designation of the socket and receives a FIN packet in response. The client function unit 137 deletes the socket.

Figure 16:
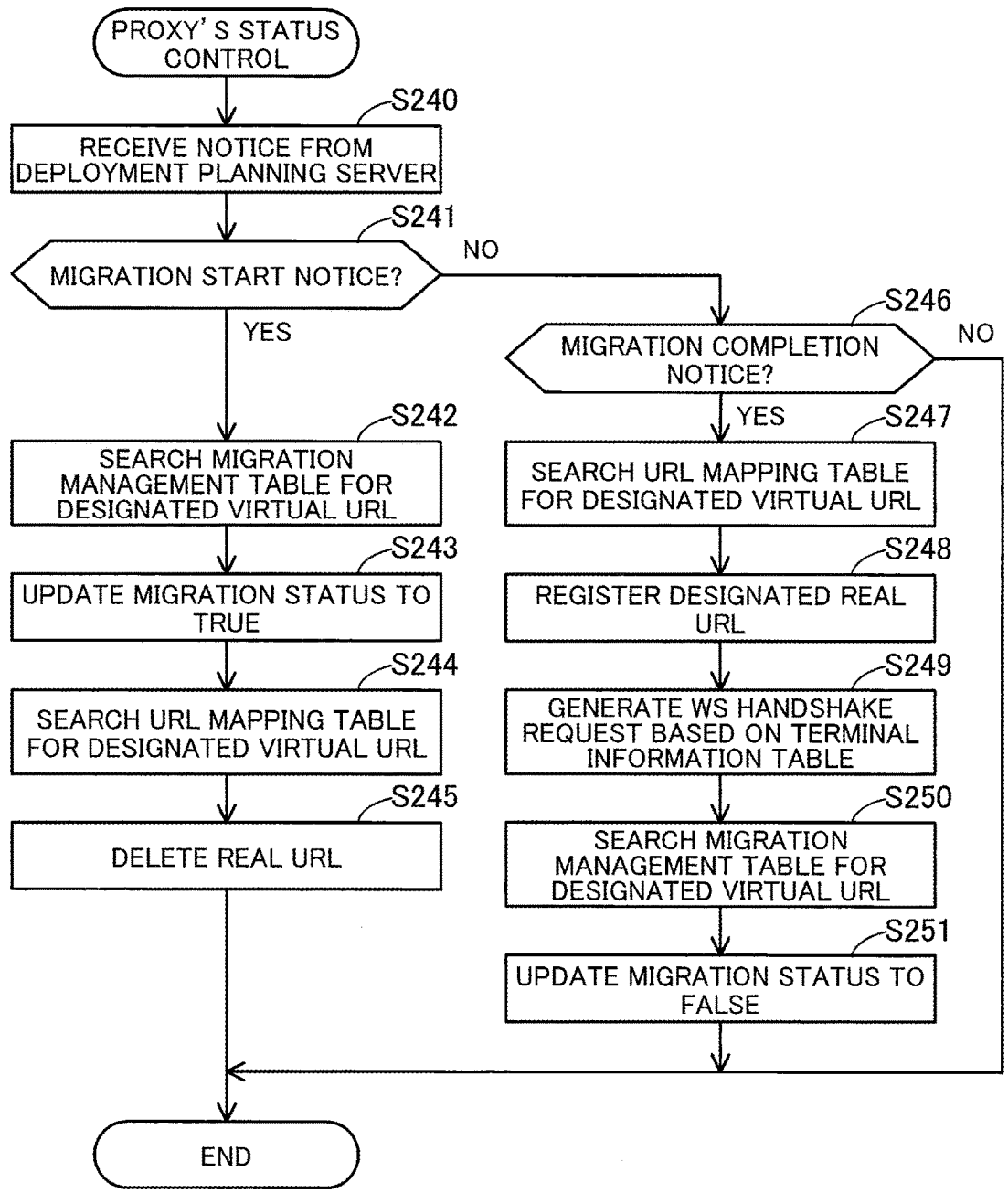
FIG. 16 is a flowchart illustrating an example of a proxy's status control procedure.

FIG. 16 is a flowchart illustrating an example of a proxy's status control procedure.

(Step S240) The status control unit 123 receives a notice from the deployment planning server 200.

(Step S241) The status control unit 123 determines whether the notice received in step S240 is a migration start notice. If the received notice is a migration start notice, the process moves to step S242. If not, the process moves to step S246.

(Step S242) The status control unit 123 extracts a virtual URL included in the received migration start notice (i.e., a designated virtual URL). The status control unit 123 searches the migration management table 126 for a record including the extracted virtual URL.

(Step S243) The status control unit 123 updates the migration status included in the record found in step S242 to TRUE.

(Step S244) The status control unit 123 searches the URL mapping table 127 for a record including the virtual URL extracted in step S242.

(Step S245) The status control unit 123 deletes a real URL included in the record found in step S244. Then, the proxy's status control ends.

(Step S246) The status control unit 123 determines whether the message received in step S240 is a migration completion notice. If the received message is a migration completion notice, the process moves to step S247. If not, the proxy's status control ends.

(Step S247) The status control unit 123 extracts a virtual URL included in the received migration completion notice (i.e., a designated virtual URL). The status control unit 123 searches the URL mapping table 127 for a record including the extracted virtual URL.

(Step S248) The status control unit 123 extracts a real URL included in the received migration completion notice (a designated real URL). The status control unit 123 registers the extracted real URL in the record found in step S247.

(Step S249) The data reserving unit 134 generates a HTTP message carrying a WebSocket handshake request. In this regard, a corresponding HTTP header registered in the terminal information table 124 is used as the HTTP header of the HTTP message to be generated.

(Step S250) The status control unit 123 searches the migration management table 126 for a record including the virtual URL extracted in step S247.

(Step S251) The status control unit 123 updates the migration status included in the record found in step S250 to FALSE.

Next, the processes of FIGS. 14 to 16 are described along the sequence illustrated in FIG. 8. In response to an input of the virtual URL of the server application 140, "ws://vurl:80/app1", the terminal 41 queries the DNS server 43 for "vurl" and then acquires a corresponding IP address "10.x.x.40". Then, the server function unit 131 establishes a TCP connection at the request of the terminal 41 and generates Socket-1. Subsequently, the server function unit 131 receives a WebSocket handshake request with designation of the virtual URL "ws://vurl:80/app1" through Socket-1.

The socket searching unit 132 searches the socket mapping table 125 for a record including Socket-1. In this case, because the WebSocket handshake request is the first message received through Socket-1, no appropriate record is found. The terminal information saving unit 133 registers, in the terminal information table 124, the HTTP header of the received WebSocket handshake request in association with Socket-1. The data reserving unit 134 searches the migration management table 126 for a record including the designated virtual URL and confirms that the migration status is set to FALSE.

The destination solving unit 135 searches the URL mapping table 127 for a record including the designated virtual URL and acquires the real URL "ws://10.x.x.30:8880/app1" corresponding to the virtual URL. The URL rewriting unit 136 rewrites the virtual URL included in the WebSocket handshake request into the real URL.

Because a record including Socket-1 does not exist in the socket mapping table 125, the client function unit 137 establishes a TCP connection with the server application 140 identified by the real URL and generates Socket-10. The client function unit 137 adds a record associating Socket-1 with Socket-10 to the socket mapping table 125. The upgrade status of the record is set to FALSE. In addition, the client function unit 137 registers, in the socket mapping table 125, the index, "#1", of the record including the virtual URL in the migration management table 126 as the pointer in association with Socket-1 and Socket-10. The client function unit 137 transmits a WebSocket handshake request through Socket-10. Subsequently, the client function unit 137 receives, through Socket-10, a WebSocket handshake response in which "websocket" is set in the Upgrade field.

The socket searching unit 138 searches the socket mapping table 125 for a record including Socket-10. The close disabling unit 139 confirms that the migration status corresponding to Socket-10 is set to FALSE. The server function unit 131 confirms that "websocket" is set in the Upgrade field of the HTTP header of the received WebSocket handshake response. Then, the server function unit 131 updates the upgrade status corresponding to Socket-10 to TRUE. Subsequently, the server function unit 131 transmits a WebSocket handshake response through Socket-1 associated with Socket-10.

The server function unit 131 receives a WebSocket message through Socket-1. The socket searching unit 132 searches the socket mapping table 125 for a record including Socket-1 and confirms that the upgrade status is set to TRUE. Based on the pointer corresponding to Socket-1, the data reserving unit 134 accesses the record with the index "#1" in the migration management table 126 and confirms that the migration status of the record is set to FALSE.

The destination solving unit 135 acquires, from the socket mapping table 125, Socket-10 associated with Socket-1. The client function unit 137 transmits the WebSocket message through Socket-10. Subsequently, the client function unit 137 receives a WebSocket message through Socket-10. The socket searching unit 138 searches the socket mapping table 125 for a record including Socket-10. The close disabling unit 139 confirms that the upgrade status of the record is set to TRUE. Then, based on the pointer corresponding to Socket-10, the close disabling unit 139 accesses a record with the index "#1" in the migration management table 126 and confirms that the migration status of the record is set to FALSE. In this case, the close disabling unit 139 determines that termination of the close notice is not needed. The server function unit 131 transmits the WebSocket message through Socket-1 associated with Socket-10.

When migration of the server application 140 is decided, the migration start informing unit 232 transmits, to the reverse proxy 120, a migration start notice with designation of the virtual URL "ws://vurl:80/app1". The status control unit 123 searches the migration management table 126 for a record including the virtual URL and updates the migration status of the found record to TRUE. In addition, the status control unit 123 searches the URL mapping table 127 for a record including the virtual URL and, then, deletes the real URL of the found record (i.e., updates the real URL to NULL).

The deployment planning server 200 transmits a stop instruction to the server application 140 on the Web server 100a. In response, the server application 140 transmits a WebSocket close notice over each TCP connection. The client function unit 137 receives the close notice through Socket-10. The socket searching unit 138 searches the socket mapping table 125 for a record including Socket-10. The close disabling unit 139 confirms that the upgrade status of the record is set to TRUE. Then, based on the pointer corresponding to Socket-10, the close disabling unit 139 accesses a record with the index "#1" in the migration management table 126 and confirms that the migration status of the record is set to TRUE. Subsequently, the close disabling unit 139 discards the close notice without outputting it to the server function unit 131. The server function unit 131 deletes Socket-10 from the socket mapping table 125. The client function unit 137 closes the TCP connection with the server application 140 and deletes Socket-10.

Because the TCP connection between the terminal and the reverse proxy 120 is not closed, the server function unit 131 receives a WebSocket message through Socket-1. The socket searching unit 132 searches the socket mapping table 125 for a record including Socket-1 and confirms that the upgrade status of the record is set to TRUE. Based on the pointer corresponding to Socket-1, the data reserving unit 134 accesses a record with the index "#1" in the migration management table 126 and confirms that the migration status of the record is set to TRUE. Subsequently, the data reserving unit 134 saves the WebSocket message in the data storing unit 122.

When the server application 140 has been migrated from the Web server 100a to the Web server 100, the migration completion informing unit 233 transmits a migration completion notice to the reverse proxy 120. The migration completion notice includes the virtual URL "ws://vurl:80/app1" and a real URL "ws://10.x.x.40:8880/app1". The status control unit 123 searches the URL mapping table 127 for a record including the virtual URL and registers the provided real URL in association with the virtual URL. In addition, the status control unit 123 searches the migration management table 126 for a record including the virtual URL and updates the migration status of the record to FALSE.

When the migration status has changed from TRUE to FALSE, the data reserving unit 134 generates a WebSocket handshake request in order to transfer the WebSocket message stored in the data storing unit 122. In this regard, the data reserving unit 134 uses a corresponding HTTP header registered in the terminal information table 124 as the HTTP header of the WebSocket handshake request. Following the generation of the WebSocket handshake request, the data reserving unit 134 outputs the WebSocket message stored in the data storing unit 122. Note that, instead of the data reserving unit 134 monitoring the migration status registered in the migration management table 126, the status control unit 123 may inform the data reserving unit 134 of the change of the migration status to FALSE.

Because a server-side socket corresponding to Socket-1 is not registered in the socket mapping table 125, the client function unit 137 establishes a TCP connection with the server application 140 identified by the real URL and generates Socket-11. The client function unit 137 registers, in the socket mapping table 125, Socket-11 in association with Socket-1. The client function unit 137 transmits the WebSocket handshake request generated by the data reserving unit 134 through Socket-11 and, then, receives a WebSocket handshake response through Socket-11. Subsequently, the client function unit 137 transmits the WebSocket message output from the data storing unit 122 through Socket-11.

According to the information processing system of the second embodiment, when the server application 140 is migrating, close notices issued by the server application 140 are individually terminated by the reverse proxies 120 and 120b. This allows the terminals 41, 42, 51, and 52 to recognize the continuation of WebSocket sessions, thereby preventing the terminals 41, 42, 51, and 52 from closing their TCP connections in response to the close notices. Then, when the migration is completed, the reverse proxies 120 and 120b associate each TCP connection on the terminals 41, 42, 51, and 52 side and a TCP connection on the server application 140 side so that WebSocket messages are transferred therebetween. Herewith, the terminals 41, 42, 51, and 52 are able to continuously use TCP connections established before the migration of the server application 140 even after the migration. Thus, there is no need to re-establish TCP connections. This allows the users of the terminals 41, 42, 51, and 52 to continue to use services of the server application 140 even after the migration without the need for operations such as login procedures, thus not impairing users' convenience.

In addition, because data of the WebSocket sessions is also migrated at the time of the migration of the server application 140, the server application 140 is able to take over communication context prior to the migration and continue the WebSocket sessions. Further, when the server application 140 is not migrating, the reverse proxies 120 and 120b transfer close notices without terminating them, unlike during the migration of the server application 140. Herewith, it is possible to appropriately perform WebSocket communication at normal times.

(c) Third Embodiment

While omitting repeated explanations, the following description of a third embodiment focuses on differences from the second embodiment above. According to the second embodiment, a TCP connection is established between Web servers remotely located from each other after migration of a server application. On the other hand, according to the third embodiment, a TCP connection is established in advance between the Web servers distant from each other before the migration of the server application. The preliminary establishment of a TCP connection is made between reverse proxies individually installed on the different Web servers. This allows a reduction in the time during which services of the server application 140 are substantially interrupted.

Figure 17:
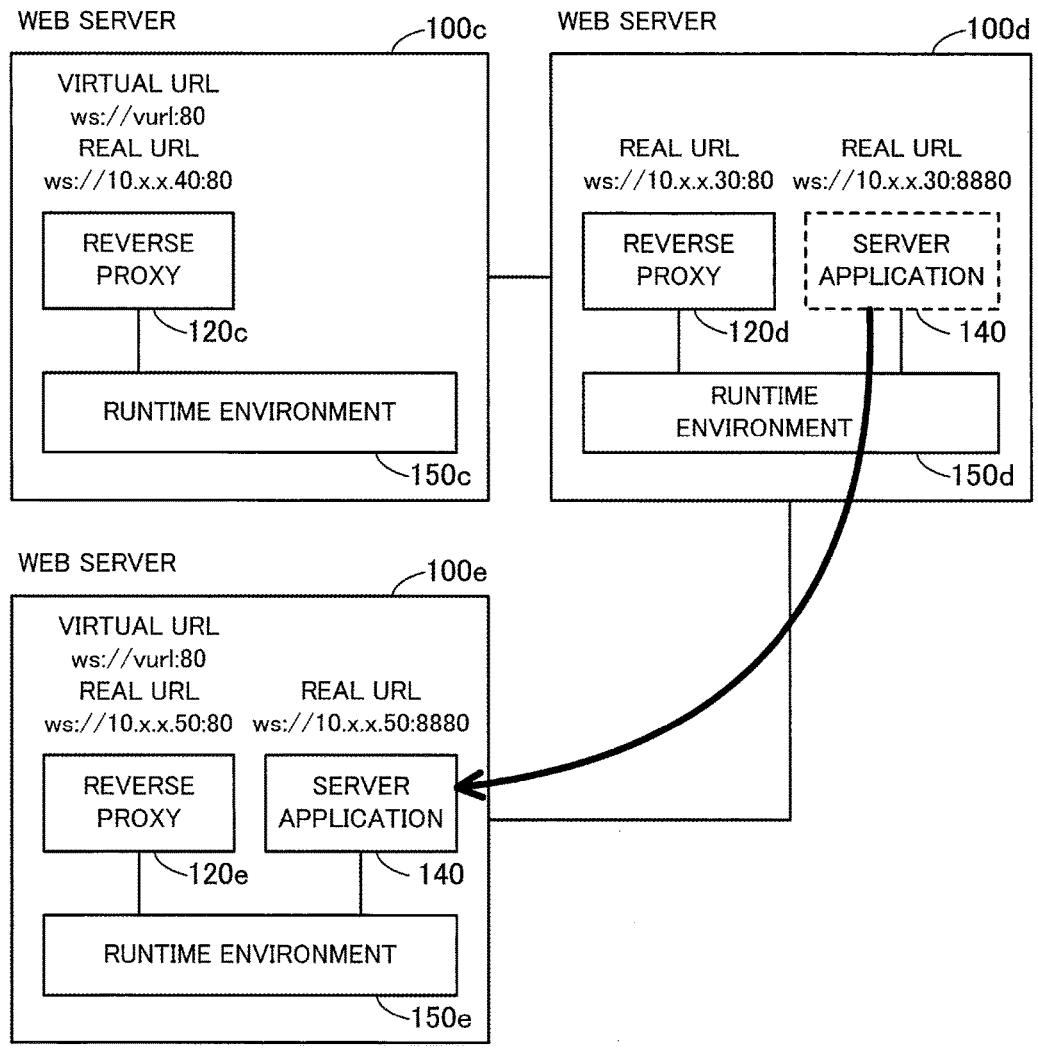
FIG. 17 illustrates a deployment example of a server application according to a third embodiment.

FIG. 17 illustrates a deployment example of the server application according to the third embodiment. The information processing system according to the third embodiment includes Web servers 100c, 100d, and 100e in place of the Web servers 100, 100a, and 100b of the second embodiment. The Web servers 100c, 100d, and 100e are installed at the base 40, the cloud 30, and the base 50, respectively. The Web server 100c runs a reverse proxy 120c and a runtime environment 150c. The Web server 100d runs a reverse proxy 120d and a runtime environment 150d. The Web server 100e runs a reverse proxy 120e and a runtime environment 150e. Now let us consider the case where the server application 140 is first deployed to the Web server 100*d* and subsequently migrated to the Web server 100*e*.

The IP address of the Web server 100*c* is "10.x.x.40". The IP address of the Web server 100*d* is "10.x.x.30". The IP address of the Web server 100*e* is "10.x.x.50". When the server application 140 is deployed to the Web server 100*d*, the server application 140 is assigned a real URL including "ws://10.x.x.30:8880". When the server application 140 is deployed to the Web server 100*e*, the server application 140 is assigned a real URL including "ws://10.x.x.50:8880". The reverse proxies 120*c* and 120*e* are individually assigned a virtual URL including "ws://vurl:80". In addition to the virtual URL, the reverse proxy 120*c* is also assigned a real URL including "ws://10.x.x.40:80". Similarly, in addition to the virtual URL, the reverse proxy 120*e* is also assigned a real URL including "ws://10.x.x.50:80". The reverse proxy 120*d* is assigned a real URL including "ws://10.x.x.30:80". According to the third embodiment, the reverse proxies 120*c* and 120*e* do not directly communicate with a server application deployed to a different Web server but communicate with it via a different reverse proxy. The real URLs of the reverse proxies 120*c*, 120*d*, and 120*e* are used for reverse proxy-to-reverse proxy communication.

In the case where the server application 140 is deployed to the Web server 100*d*, upon receiving an access request including a virtual URL of the server application 140, the reverse proxy 120*c* converts the virtual URL into the real URL of the reverse proxy 120*d* and transfers the access request to the reverse proxy 120*d*. The reverse proxy 120*d* converts the real URL of the reverse proxy 120*d* into the real URL of the server application 140 and transfers the access request to the server application 140. In the case where the server application 140 is deployed to the Web server 100*e*, upon receiving an access request including the virtual URL of the server application 140, the revere proxy 120*c* converts the virtual URL into the real URL of the reverse proxy 120*e* and transfers the access request to the reverse proxy 120*e*. The reverse proxy 120*e* converts the real URL of the reverse proxy 120*e* into the real URL of the server application 140 and transfers the access request to the server application 140.

Figure 18:
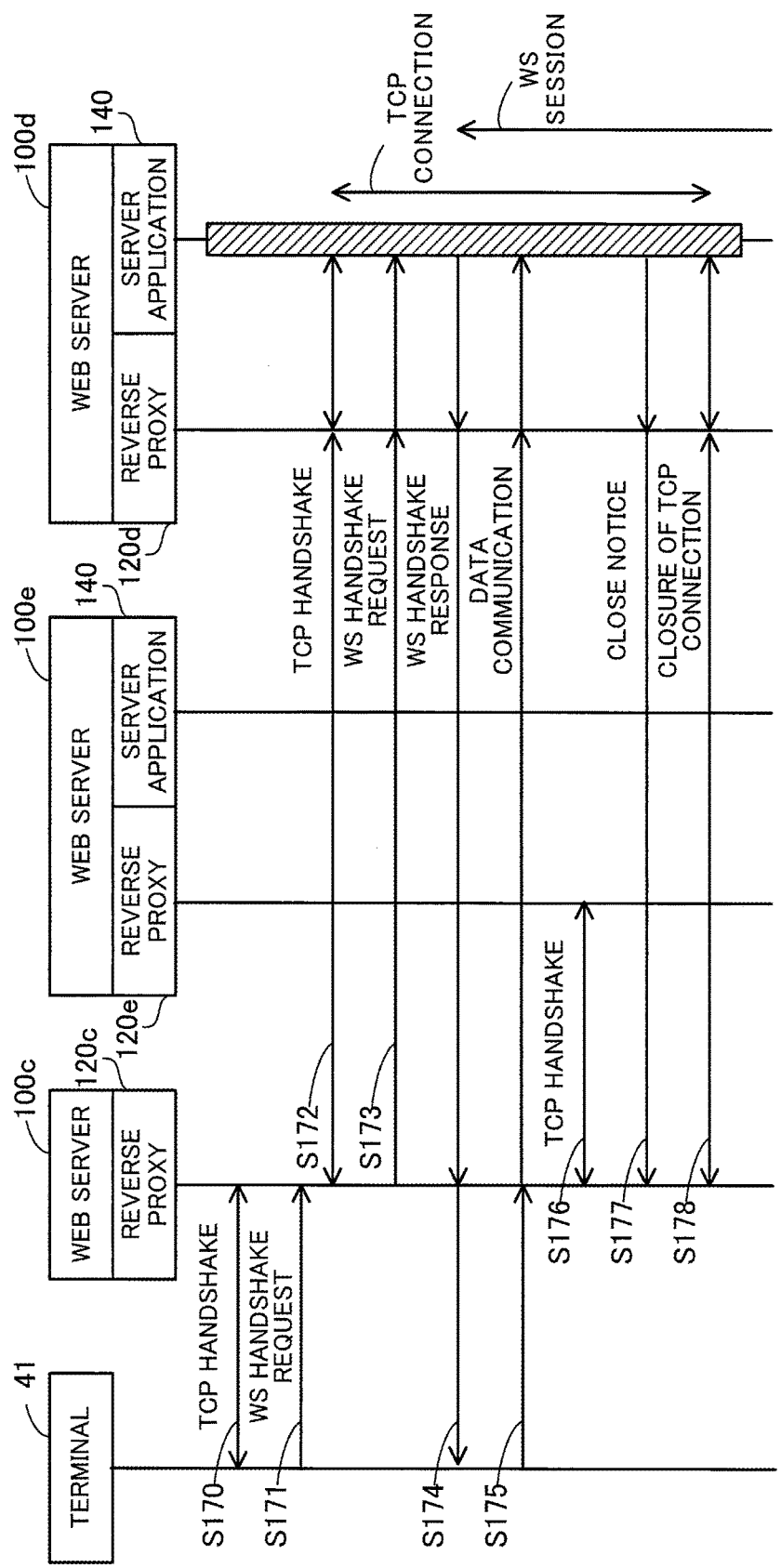
FIG. 18 is a sequence diagram illustrating a fourth example of the WebSocket communication.

FIG. 18 is a sequence diagram illustrating a fourth example of the WebSocket communication. The terminal 41 establishes a TCP connection between the terminal 41 and the reverse proxy 120*c* by having a TCP handshake with the reverse proxy 120*c* (step S170). The terminal 41 transmits, to the reverse proxy 120*c*, a WebSocket handshake request with designation of the virtual URL of the server application 140 (step S171). The reverse proxy 120*c* converts the virtual URL into the real URL of the reverse proxy 120*d*.

The reverse proxy 120*c* establishes a TCP connection between the reverse proxies 120*c* and 120*d* by having a TCP handshake with the reverse proxy 120*d*. The reverse proxy 120*d* establishes a TCP connection between the reverse proxy 120*d* and the server application 140 by having a TCP handshake with the server application 140 (step S172). The reverse proxy 120*c* transfers the WebSocket handshake request to the reverse proxy 120*d*. The reverse proxy 120*d* converts the real URL of the reverse proxy 120*d* into the real URL of the server application 140 and transfers the Web-Socket handshake request to the server application 140 (step S173). The server application 140 transmits a WebSocket handshake response to the reverse proxy 120*d*, which then transfers the WebSocket handshake response to the reverse proxy 120*c*. The reverse proxy 120*c* transfers the Web-Socket handshake response to the terminal 41 (step S174). The terminal 41 transmits a WebSocket message to the reverse proxy 120*c*, which then transfers the WebSocket message to the reverse proxy 120*d*. The reverse proxy 120*d* transfers the WebSocket message to the server application 140 (step S175).

Assume here that a deployment planning server 200*a* (to be described later) has decided to migrate the server application 140 from the Web server 100*d* to the Web server 100*e*. Upon receiving a migration preparation notice from the deployment planning server 200*a*, the reverse proxy 120*c* establishes in advance a TCP connection by having a TCP handshake with the reverse proxy 120*e* of the migration-destination Web server 100*e* (step S176). Then, in response to a migration instruction issued by the deployment planning server 200*a*, the server application 140 transmits a close notice to the reverse proxy 120*d*. The reverse proxy 120*d* transfers the close notice to the reverse proxy 120*c*, which then terminates the received close notice (step S177). Upon receiving the close notice, the reverse proxy 120*c* closes the TCP connection between the reverse proxies 120*c* and 120*d*. Similarly, upon receiving the close notice, the reverse proxy 120*d* closes the TCP connection between the reverse proxy 120*d* and the server application 140 (step S178).

Figure 19:
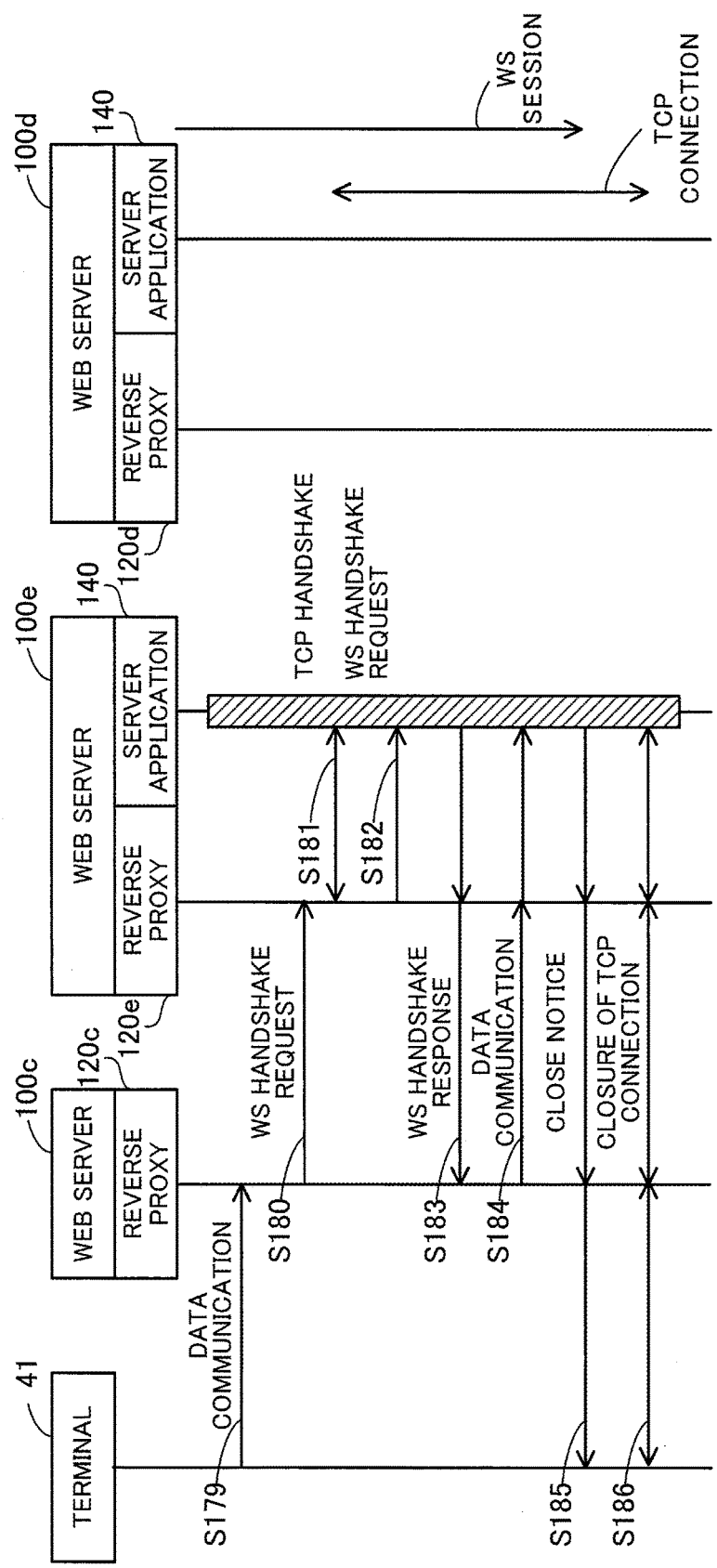
FIG. 19 is the sequence diagram illustrating the fourth example of the WebSocket communication, continuing from FIG. 18.

FIG. 19 is the sequence diagram illustrating the fourth example of the WebSocket communication, continuing from FIG. 18. As recognizing the WebSocket session staying open, the terminal 41 transmits a WebSocket message to the reverse proxy 120*c* (step S179). The reverse proxy 120*c* saves the received WebSocket message in a buffer. Then, upon receiving a migration completion notice from the deployment planning server 200*a*, the reverse proxy 120*c* generates a WebSocket handshake request and transmits it to the reverse proxy 120*e* (step S180). For the transmission of the WebSocket handshake request, the TCP connection established in advance in step S176 above is used. Therefore, there is no need to initiate a TCP handshake between the Web servers 100*c* and 100*e* in response to the migration completion notice.

The reverse proxy 120*e* establishes a TCP connection between the reverse proxy 120*e* and the server application 140 by having a TCP handshake with the server application 140 (step S181). The TCP connection is a connection established inside the Web server 100*e*. Therefore, the cost for the TCP handshake in step S181 is substantially lower than that for the TCP handshake in step S176. The reverse proxy 120*e* transfers the WebSocket handshake request received from the reverse proxy 120*c* to the server application 140 (step S182). The server application 140 transmits a WebSocket handshake response to the reverse proxy 120*e*, which then transfers the WebSocket handshake response to the reverse proxy 120*c* (step S183). The reverse proxy 120*c* transfers the WebSocket message stored in the buffer to the reverse proxy 120*e*, which then transfers the WebSocket message to the server application 140 (step S184).

In the case of ending the WebSocket session normally, the server application 140 transmits a close notice to the reverse proxy 120*e*, which then transfers the close notice to the reverse proxy 120*c*. The reverse proxy 120*c* in turn transfers the close notice to the terminal 41 (step S185). In response, the terminal 41 closes the TCP connection between the terminal 41 and the reverse proxy 120*c*. The reverse proxy 120*c* closes the TCP connection between the reverse proxies 120*c* and 120*e*. The reverse proxy 120*e* closes the TCP connection between the reverse proxy 120*e* and the server application 140 (step S186).

On the part of the server application 140, a single TCP connection is kept open from step S172 to step S178 while another TCP connection is kept open from step S181 to step S186. However, for the server application 140, there is no TCP connection between steps S178 and S181. On the other hand, on the part of the terminal 41, a single TCP connection stays open without a connection closure from step S170 to step S186. In addition, for the terminal 41, a single Websocket session appears to stay open from step S174 to step S185. Further, along with the migration of the server application 140, the session data is also migrated. This allows the terminal 41 to continue the communication with no regard to the migration of the server application 140.

Figure 20:
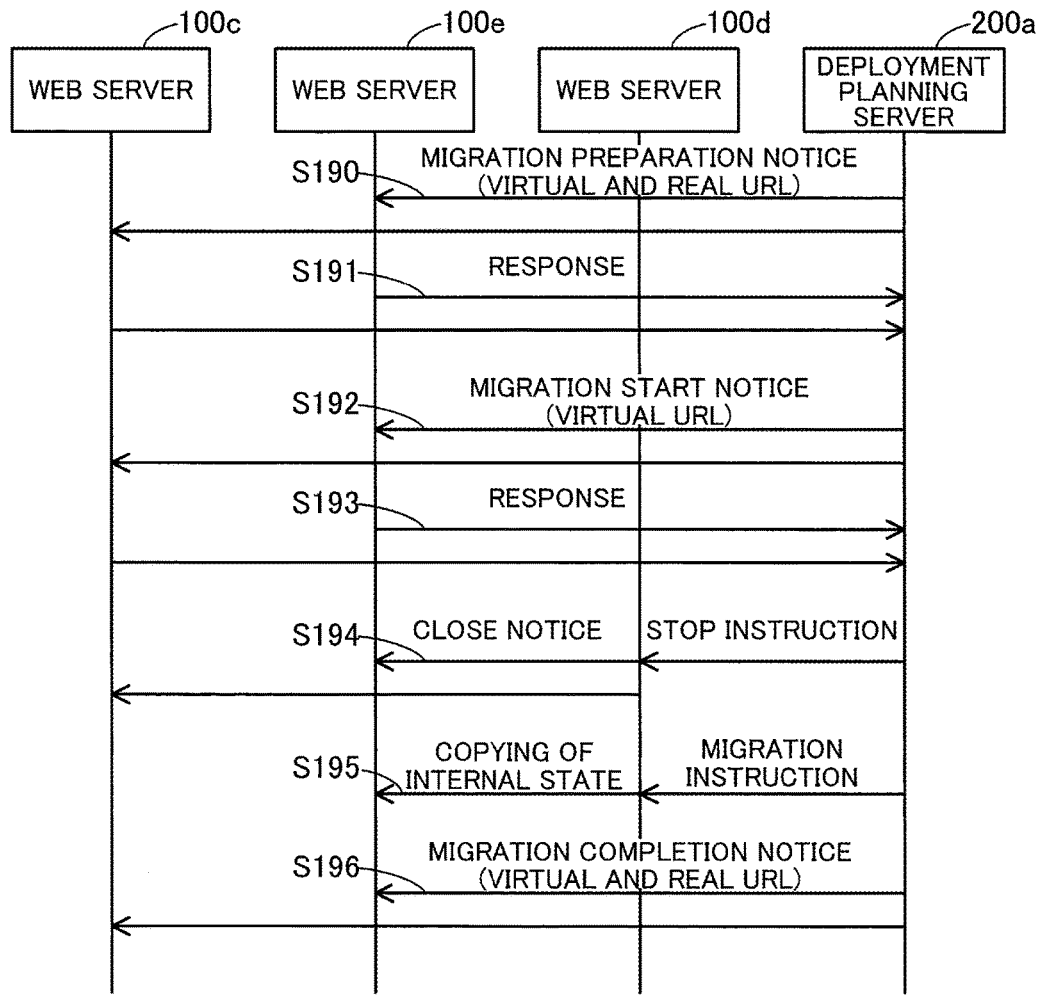
FIG. 20 is a sequence diagram illustrating an example of migration control communication according to the third embodiment.

FIG. 20 is a sequence diagram illustrating an example of migration control communication according to the third embodiment. The deployment planning server 200a decides to migrate the server application 140 from the Web server 100d to the Web server 100e. Then, the deployment planning server 200a transmits migration preparation notices to the reverse proxies 120c and 120e of the Web servers 100c and 100e, respectively (step S190). Each of the migration preparation notices includes the virtual URL identifying the server application 140 and the real URL of the reverse proxy 120e running on the migration-destination Web server 100e. For each TCP connection having been established for the server application 140, the reverse proxy 120c establishes a new TCP connection with the reverse proxy 120e. Once a TCP handshake is exchanged between the different Web servers, the reverse proxies 120c and 120e individually transmit responses to the deployment planning server 200a (step S191).

Upon receiving the responses to the migration preparation notices from all the reverse proxies, the deployment planning server 200a transmits migration start notices to the reverse proxies 120c and 120e (step S192). Each of the migration start notices includes the virtual URL of the server application 140. The reverse proxies 120c and 120e individually transmit responses to the deployment planning server 200a (step S193). The deployment planning server 200a transmits a stop instruction to the server application 140. The server application 140 transmits a close notice with respect to each TCP connection kept open for WebSocket communication (step S194). For example, the server application 140 transmits one or two or more close notices to the reverse proxies 120c and 120e. These close notices correspond to the close notice in step S177 of FIG. 18.

The deployment planning server 200a transmits a migration instruction to the runtime environment 150d of the Web server 100d. The runtime environment 150d transmits the program and session data of the server application 140 to the Web server 100e (step S195). The runtime environment 150d stops the server application 140. The runtime environment 150e of the Web server 100e starts the server application 140 using the program and session data. The deployment planning server 200a transmits migration completion notices to the reverse proxies 120c and 120e (step S196). Each of the migration completion notices includes the virtual URL of the server application 140 and the real URL of the reverse proxy 120e running on the migration-destination Web server 100e.

Figure 21:
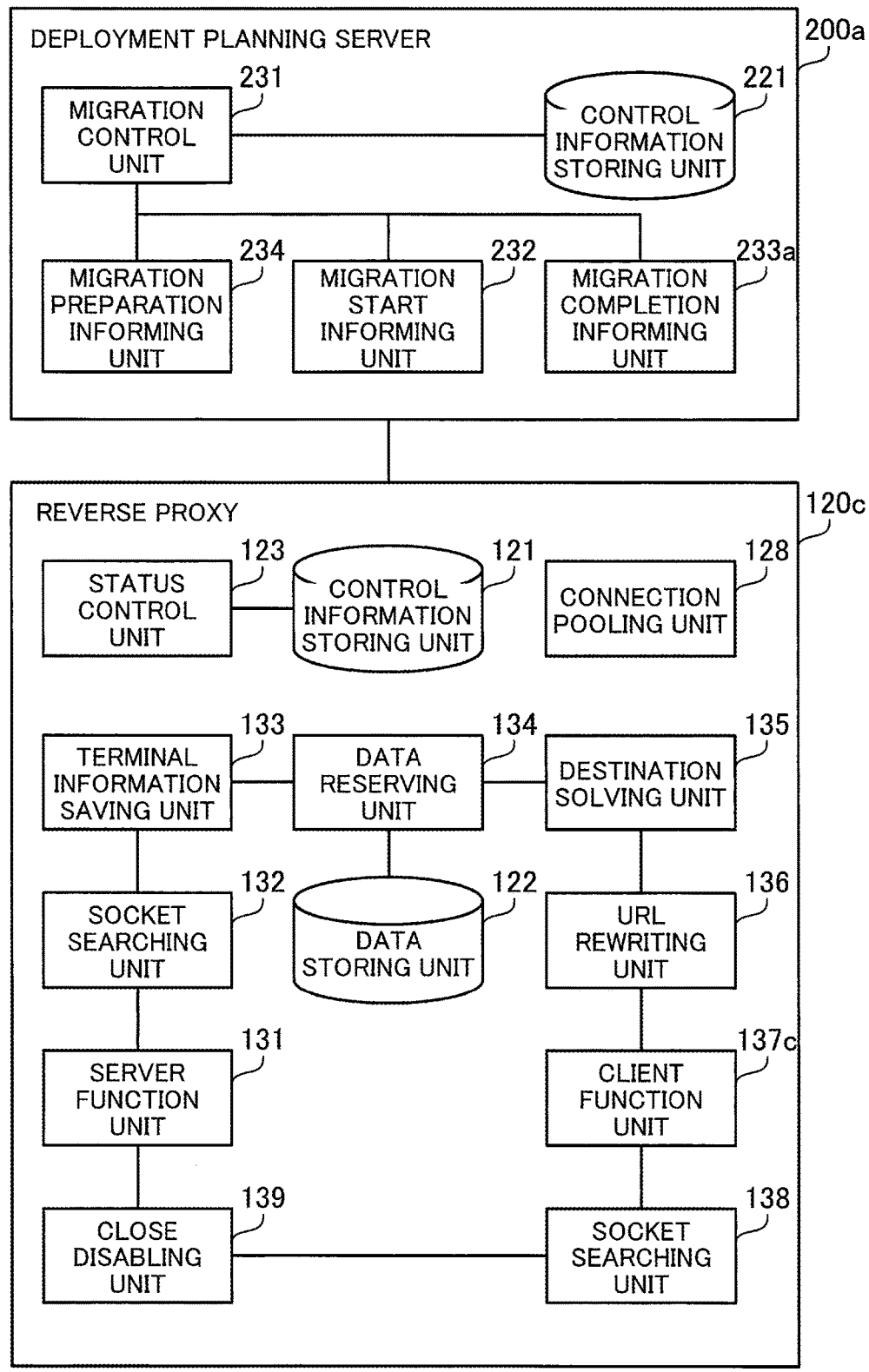
FIG. 21 is a block diagram illustrating an example of functions of a reverse proxy according to the third embodiment.

FIG. 21 is a block diagram illustrating an example of functions of a reverse proxy according to the third embodiment. The reverse proxy 120c includes the control information storing unit 121, the data storing unit 122, the status control unit 123, and a connection pooling unit 128. The reverse proxy 120c also includes the server function unit 131, the socket searching unit 132, the terminal information saving unit 133, the data reserving unit 134, the destination solving unit 135, the URL rewriting unit 136, a client function unit 137c, the socket searching unit 138, and the close disabling unit 139. Each of the reverse proxies 120d and 120e may be implemented with similar modules to those of the reverse proxy 120c.

The control information storing unit 121 includes the terminal information table 124, the socket mapping table 125, the migration management table 126, and the URL mapping table 127, as in the case of the second embodiment. Note however that, as for the socket mapping table 125, each field in the server-side socket column may contain the number of a socket corresponding to a TCP connection established with a different reverse proxy. In addition, as for the URL mapping table 127, each field in the real URL column may contain the real URL of a different reverse proxy.

Upon receiving a migration preparation notice from the deployment planning server 200a, the connection pooling unit 128 searches the migration management table 126 for a record including the designated virtual URL and acquires the index included in the found record. The connection pooling unit 128 searches the socket mapping table 125 for records including the acquired index and counts the number of the found records. That is, the connection pooling unit 128 counts how many TCP connections currently exist for the designated virtual URL. Then, the connection pooling unit 128 establishes TCP connections as many as the counted TCP connections with a reverse proxy indicated by the real URL included in the migration preparation notice, and pools them.

In order to communicate with the different reverse proxy shortly after the migration of the server application 140, the client function unit 137c selects a TCP connection from those pooled and uses it instead of establishing a new TCP connection. The client function unit 137c registers, in the socket mapping table 125, the number of a socket corresponding to the selected TCP connection in association with a socket on the server function unit 131 side.

The deployment planning server 200a includes the control information storing unit 221, the migration control unit 231, the migration start informing unit 232, a migration completion informing unit 233a, and a migration preparation informing unit 234. The migration completion informing unit 233a transmits migration completion notices to the reverse proxies 120c and 120e when the migration of the server application 140 is completed. Each of the migration completion notices includes the virtual URL identifying the server application 140 and the real URL assigned to the reverse proxy of the migration-destination Web server. When migration of the server application 140 is decided, the migration preparation informing unit 234 transmits migration preparation notices to the reverse proxies 120c and 120e prior to the transmission of migration start notices. Each of the migration preparation notices includes the virtual URL identifying the server application 140 and the real URL assigned to the reverse proxy of the migration-destination Web server.

Note here that establishment of a new TCP connection before the migration of the server application 140 means that an old TCP connection and the new TCP connection coexist at least temporarily, which results in maintaining twice as many TCP connections as the method of the second embodiment. This may cause too much load on the Web servers 100c and 100e. In view of the problem, a technique may be adopted in which load on the Web servers 100c and 100e is monitored and, then, whether to establish a new TCP connection before or after the migration of the server application 140 is selected based on the monitored load.

For example, the deployment planning server 200*a* monitors the memory usage of the Web servers 100*c* and 100*e*. In the case where free memory space on the Web servers 100*c* and 100*e* exceeds or is equal to a threshold, the deployment planning server 200*a* transmits migration preparation notices to the Web servers 100*c* and 100*e*. Herewith, a new TCP connection is established before the migration of the server application 140. On the other hand, if the free memory space on the Web servers 100*c* and 100*e* is below the threshold, the deployment planning server 200*a* does not transmit the migration preparation notices to the Web servers 100*c* and 100*e*. Herewith, a new TCP connection is established after the migration of the server application 140. Alternatively, the deployment planning server 200*a* may monitor CPU utilization of the Web servers 100*c* and 100*e* and, then, determine to transmit the migration preparation notices if the CPU utilization is equal to or below a threshold and determine not to transmit the migration preparation notices if the CPU utilization exceeds the threshold. Further, both the CPU utilization and the memory usage may be used as determination criteria.

The information processing system of the third embodiment achieves the same effect as that of the second embodiment. Further, the information processing system of the third embodiment reduces the duration from when the server application 140 transmits close notices until a WebSocket message is again allowed to be transferred to the server application 140. As a result, it is possible to reduce the time during which services of the server application 140 are substantially interrupted on the part of the terminals 41, 42, 51, and 52, thus enhancing the convenience of the users.

Note that the information processing of the first embodiment is implemented by causing a computer to execute a program, as described above. In addition, the information processing of the second embodiment is implemented by causing the Web servers 100, 100*a*, and 100*b* and the deployment planning server 200 to execute a program. The information processing of the third embodiment is implemented by causing the Web servers 100*c*, 100*d*, and 100*e* and the deployment planning server 200*a* to execute a program.

Such a program may be recorded in a computer-readable storage medium (for example, the storage medium 113). Examples of such a computer-readable storage medium include a magnetic disk, an optical disk, a magneto-optical disk, and semiconductor memory. Examples of the magnetic disk are a flexible disk and a HDD. Examples of the optical disk are a compact disc (CD), CD-recordable (CD-R), CD-rewritable (CD-RW), DVD, DVD-R, and DVD-RW. The program may be recorded on portable storage media and then distributed. In such a case, the program may be executed after being copied from such a portable storage medium to a different storage medium (for example, the HDD 103).

According to one aspect, it is possible to prevent a connection closure at the time of switching a communication endpoint.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A session control method executed by a system in which a first apparatus and a second apparatus are able to communicate with each other via a relay process and a third apparatus and the second apparatus are able to communicate with each other via the relay process, the session control method comprising:
   storing control information in which a first connection established on a first apparatus side in relation to the relay process is associated with a second connection established on a second apparatus side in relation to the relay process;
   terminating, when a close instruction message at a communication layer higher than the first and second connections is issued from the first apparatus to the second apparatus, the close instruction message on the relay process and updating the control information in response to issuance of the close instruction message; and
   enabling, when a switchover notice indicating a switch from the first apparatus to the third apparatus is given and the control information indicates the issuance of the close instruction message, a third connection established on a third apparatus side in relation to the relay process and updating the control information in such a manner that the second connection is associated with the third connection.

2. The session control method according to claim 1, wherein:
   the terminating includes
      terminating the close instruction message on the relay process when the close instruction message is issued after a switching start notice indicating start of the switch from the first apparatus to the third apparatus is given but before the switchover notice is given, and
      transferring the close instruction message to the second apparatus when the close instruction message is issued before the switching start notice.

3. The session control method of claim 1, further comprising:
   establishing the third connection between the relay process and the third apparatus before the switchover notice is given.

4. The session control method of claim 1, further comprising:
   selecting, based on load on an apparatus running the relay process, the third connection to be established before or after the switchover notice is given.

5. A non-transitory computer-readable storage medium storing a computer program that causes a computer to perform a procedure comprising:
   storing control information in which a first connection established on a first apparatus side is associated with a second connection established on a second apparatus side;
   terminating a close instruction message, which is issued from a communication layer higher than the first and second connections and directed to a second apparatus, upon receiving the close instruction message from a first apparatus, and updating the control information in response to the receiving of the close instruction message; and
   enabling, when a switchover notice indicating a switch from the first apparatus to a third apparatus is given and the control information indicates the receiving of the close instruction message, a third connection established on a third apparatus side and updating the control information in such a manner that the second connection is associated with the third connection.

\* \* \* \* \*